United States Patent [19]
Pattantyus et al.

[11] Patent Number: 5,945,743
[45] Date of Patent: Aug. 31, 1999

[54] SUPERVISORY INTEGRATED CIRCUIT FOR ANTI-LOCK BRAKE SYSTEM UNITS

[75] Inventors: Tamas I. Pattantyus, Dallas, Tex.; Cheryl L. Greenly, Elyria, Ohio; Ronald E. Squires, Albion, Ind.

[73] Assignee: AlliedSignal Truck Brake Systems Co., Elyria, Ohio

[21] Appl. No.: 08/825,875

[22] Filed: Apr. 2, 1997

[51] Int. Cl.⁶ ..................................... B60L 1/00
[52] U.S. Cl. ............................ 307/10.1; 701/71
[58] Field of Search .................... 307/9.1, 10.1; 303/138, 139; 361/238; 701/45, 36, 71, 76, 83, 72–75

[56] References Cited

U.S. PATENT DOCUMENTS

| | | | |
|---|---|---|---|
| 4,661,910 | 4/1987 | Reinecke et al. | 701/76 |
| 4,703,388 | 10/1987 | Ruhnau | 307/10.1 |
| 5,170,343 | 12/1992 | Matsuda | 701/76 |
| 5,739,592 | 4/1998 | Rigsby et al. | 307/10.1 |

*Primary Examiner*—Richard T. Elms

[57] ABSTRACT

A supervisory circuit for an anti-lock brake system (ABS) unit. The circuit includes an independent internal voltage reference source that provides power to the circuit components. The circuit also includes an external power source monitor powered by the internal voltage reference source which inhibits the ABS unit when an external power source voltage exceeds a predetermined level. The circuit also includes a system voltage monitor powered by the internal voltage reference source that inhibits the ABS unit when a system voltage deviates from predetermined system voltage parameters. The circuit also includes an electronic control unit (ECU) monitor powered by the internal voltage reference source that monitors a periodic signal generated by an ECU and that inhibits the ABS unit if an ECU timing signal deviates from a predetermined threshold level. The supervisory circuit helps to prevent spurious operation of ABS modulators due to race conditions.

30 Claims, 14 Drawing Sheets

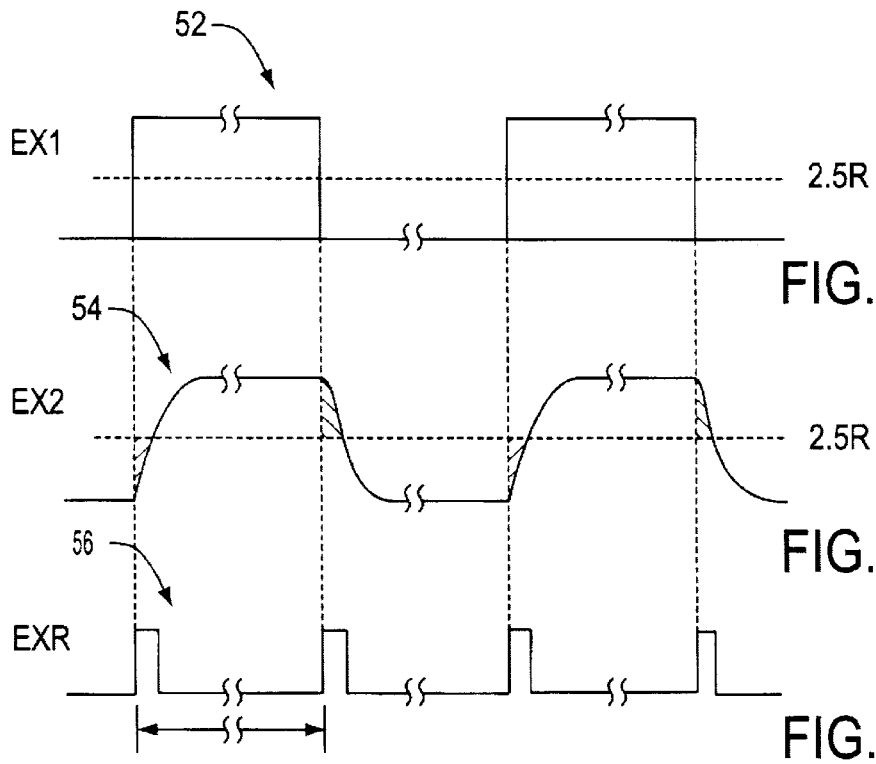
FIG. 7A
FIG. 7B
FIG. 7C
FIG. 8
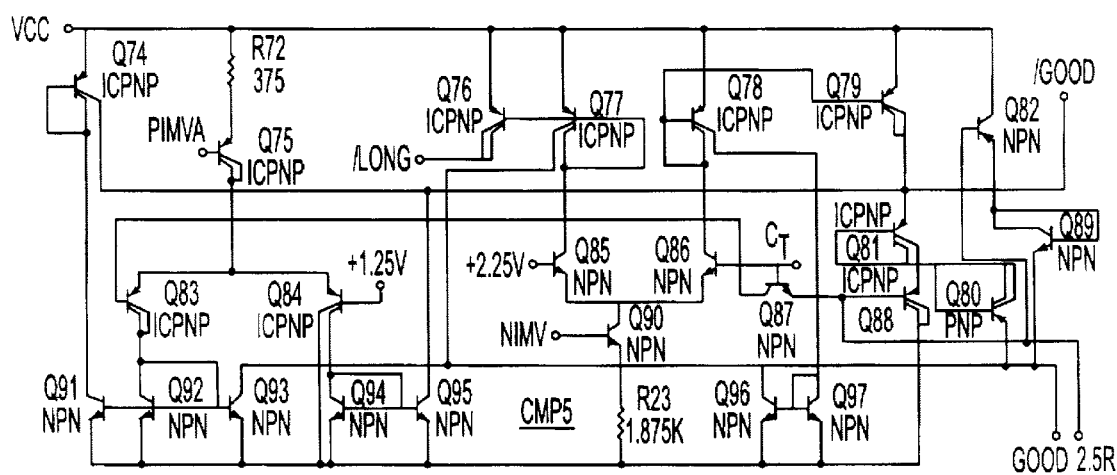

SUPERVISORY INTEGRATED CIRCUIT FOR ANTI-LOCK BRAKE SYSTEM UNITS

CROSS-REFERENCE TO RELATED APPLICATIONS

This application is related to U.S. application Ser. No. 08/828,737, entitled "Clocked Register", filed concurrently herewith.

BACKGROUND OF THE INVENTION

1. Technical Field

The present invention relates generally to anti-lock brake systems, and particularly to a supervisory integrated circuit that is capable of inhibiting brake modulation in an anti-lock brake system when the circuit senses that certain monitored system parameters fall outside a predetermined window.

2. Discussion

In response to government regulations and increasing driver safety concerns, installation of anti-lock braking system (ABS) units in motor vehicles has increased steadily in recent years. As is well known, ABS units modulate vehicle brakes when the brakes are applied in an emergency braking situation or in a vehicle traction control situation. Typically, ABS units are regulated by an on-board ABS computer, which senses one of the above conditions when the brakes are applied, and modulates the brakes through solenoid actuated valves, or modulators. In tractor trailer trucks and other heavy duty vehicles with pneumatic brake systems, solenoids associated with brake modulators are energized when an emergency or traction control situation is sensed by the ABS computer, and the brake modulators open brake chambers or block the chamber air supplies in a modulating fashion so that vehicle braking is realized in an intermittent fashion.

The on-board ABS computer, in addition to controlling application of the ABS unit, also supports communication protocol between the ABS unit and other vehicle components and includes self-diagnostics capabilities. In order to discharge these basic functions, fundamental computer operating parameters must be maintained. If the computer operating parameters are not maintained within certain operating limits, less than optimal ABS unit performance could possibly result.

SUMMARY OF THE INVENTION

The present invention provides a supervisory integrated circuit for anti-lock brake system (ABS) units that operates to ensure optimal ABS unit performance. The circuit of the present invention detects deviations from system operational parameters in the motor vehicle electronic control unit (ECU). The application specific integrated circuit (ASIC) of the present invention monitors ECU parameters, such as watch-dog pulses, battery voltage, system supply voltage level, and the ECU reset line state. When one or more of these parameters deviates from acceptable circuit parameters, the ASIC generates a set of clamping signals that inhibit energization of ABS modulator solenoids, thereby intermittently inhibiting the control system venting air from the brake chambers or blocking brake chamber air supplies. As a result, uncontrolled solenoid actuation due to system malfunction, and thus improper ABS unit operation, is avoided.

In one aspect, the present invention provides a supervisory circuit for an ABS unit, which includes an independent internal voltage reference source that provides power to circuit components. The circuit also includes an external power source monitor powered by the internal voltage reference source that inhibits the ABS unit when an external power source voltage exceeds a predetermined level. The circuit also includes a system voltage monitor powered by the internal voltage reference source that inhibits the ABS unit when a system voltage deviates from predetermined system voltage parameters. The circuit also includes an electronic control unit (ECU) monitor powered by the internal voltage reference source that monitors a periodic signal generated by an ECU and that inhibits the ABS unit if an ECU timing signal deviates from a predetermined threshold level.

BRIEF DESCRIPTION OF THE DRAWINGS

The various advantages of the present invention will become apparent to one skilled in the art by reading the following specification and subjoined claims and by referencing the following drawings in which:

FIG. 1A is an enlarged view of a modulator assembly shown in FIG. 1;

FIGS. 7A–7C are watchdog timer signal processing timing diagrams;

FIG. 8 is a circuit diagram illustrating a watch-dog timer period detector;

DETAILED DESCRIPTION OF THE PREFERRED EMBODIMENTS

Figure 1:
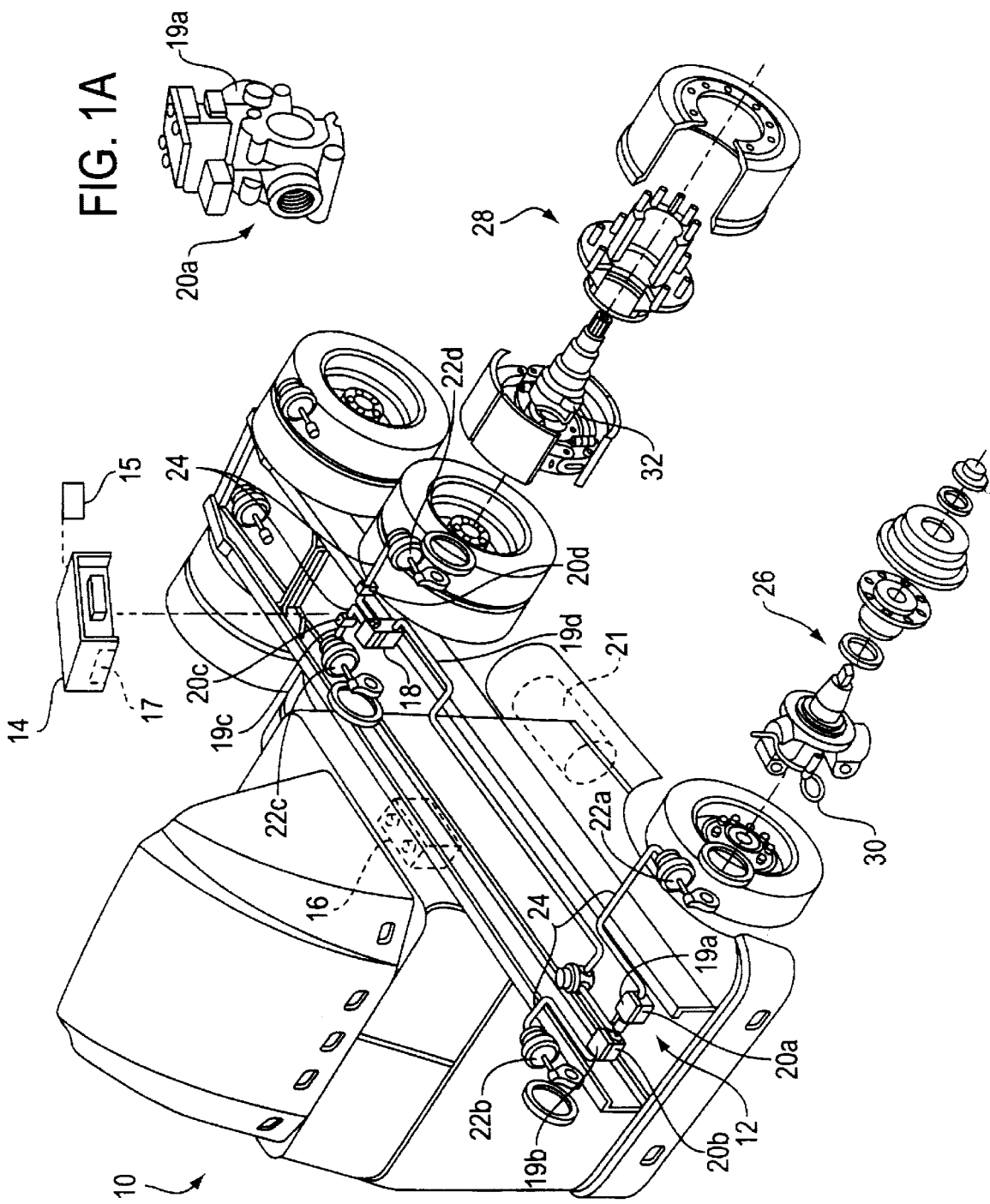
FIG. 1 is a perspective view of a semi-truck tractor showing an anti-lock brake system unit installed therein.

Referring to the drawing figures, a schematic view of a conventional truck tractor drive train 10 illustrates a conventional pneumatic tire braking system 12 installed therein. The braking system 12 is controlled by a motor vehicle electronic control unit (ECU) 14, which is preferably an Allied Signal EC-17 controller mounted on a tractor frame rail, an engine bulkhead, or other remote truck storage location. The ECU includes an application specific integrated circuit (ASIC) 15 (FIG. 2) in accordance with a preferred embodiment of the present invention that monitors ABS unit parameters and inhibits ABS unit operation if one or more of the unit parameters deviates from predetermined acceptable limits. The ECU is coupled to a battery 16 (FIG. 1) which supplies a DC voltage $V_{BAT}$, preferably in the range of between eleven volts and seventeen volts, to the ABS unit. The ECU also includes an ECU voltage supply Vdd 17 (FIG. 2) that generates a regulated DC voltage of approximately five volts for use by ECU components. The ECU voltage (Vdd) is generated from power supplied by the battery 16 (FIG. 2).

Still referring to FIG. 1, the ECU 14 is electronically coupled to a controller relay assembly 18, such as Allied Signal Assembly Model CR-15 or CR-16. The relay assembly selectively transmits control signals from the ECU 14 to solenoids 19a–d which control operation of ABS unit modulator assemblies 20a–d upon actuation of solenoid drivers implemented in the ECU 14 (FIG. 1A). An enlarged view of the solenoid 19a, the modulator assembly 20a, and the solenoid drivers in the ECU. The modulator assemblies, which are preferably Allied Signal Model No. M-22 assemblies, are each coupled to a pneumatic service reservoir 21 and to brake chambers 22a–d through pneumatic supply lines 24. The brake chambers 22a–d are coupled to vehicle front and rear axles 26, 28 in a conventional manner. Sensing mechanisms, such as those shown at 30, 32 are electronically coupled to the axles and to the ECU 14 as shown and transmit sensed wheel speed conditions to the ECU for ABS-related processing.

In operation, the sensing mechanisms 30, 32 preferably Allied Signal Sensor Model No. WS-20, sense present wheel speed when vehicle brakes are applied, and transmit corresponding signals to the ECU 14. The ECU 14 processes these signals and, if it determines that a braking condition exists that requires the ABS unit to be activated, energizes the modulator solenoids 19a–d accordingly. If the ASIC 15 determines, according to the present invention, that all system operational parameters follow within predetermined threshold conditions, the modulator units 20a–d modulate the air supply to the brake chambers. If one or more of the system parameters falls outside the threshold parameters, the ASIC 15 inhibits the ABS unit by clamping solenoid lines.

Figure 2:
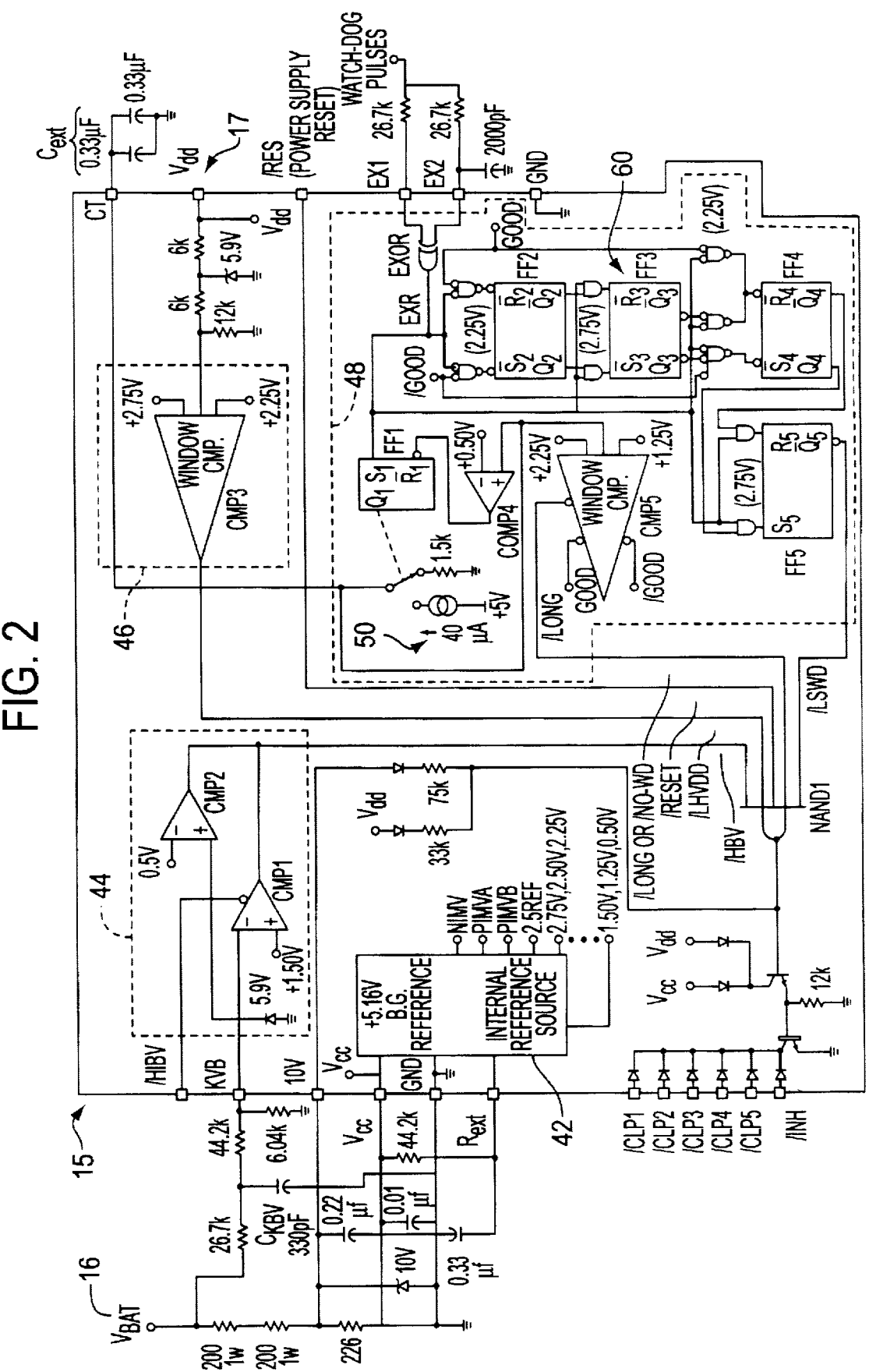
FIG. 2 is a circuit diagram illustrating a supervisory integrated circuit according to a preferred embodiment of the present invention.

Referring to FIG. 2, a circuit diagram of the ASIC 15 according to a preferred embodiment of the present invention is shown along with associated external components. The ASIC 15 of the present invention performs the above-mentioned supervisory functions via analog and digital circuits that are hardwired within the ASIC itself. The ASIC 15 is formed from a linear array consisting of numerous components connected through a metal mask designed to implement the above-mentioned specific circuit functions. According to a preferred embodiment of the present invention, the linear array features numerous transistor cells, each configured as either a PNP transistor with two collectors or an NPN transistor with one, two or three emitters.

The ASIC 15 includes several main circuit components that monitor various ABS unit operational parameters and block activation of the modulator solenoids, and thus operation of the ABS unit, in response to one or more of the ABS unit system parameters falling outside acceptable operational limits. The ASIC components include an internal voltage reference source 42, a high battery voltage detector 44, a system voltage detector 46, and a watch-dog timer 48. Each of these individual components are coupled to output lines such as an ASIC reset, shown at /RES, along with clamp outputs, designated at /CLP1-/CLP5 and /INH, to inhibit modulator operation. Each of the individual circuit components coupled to these lines will now be described in more detail.

Internal Voltaae Reference Source

The internal voltage reference source 42 is located within the ASIC and generates a 5.16 V internal reference voltage for ASIC components. The source is preferably a parallel shunt regulator which provides an accurate voltage supply to the rest of the ASIC within a wide range of voltage values of the battery 16. Even when the battery voltage is outside that operating range which is required by the ABS specifications (11 V $\leq V_{BAT} \leq$ 17.5 V) the reference voltage source 42 is active and accurate and its output is independent of the ECU supply Vdd 17. Therefore, any fault affecting the ECU supply will be detected by the ASIC as long as the reference voltage supply is present.

Figure 2A:
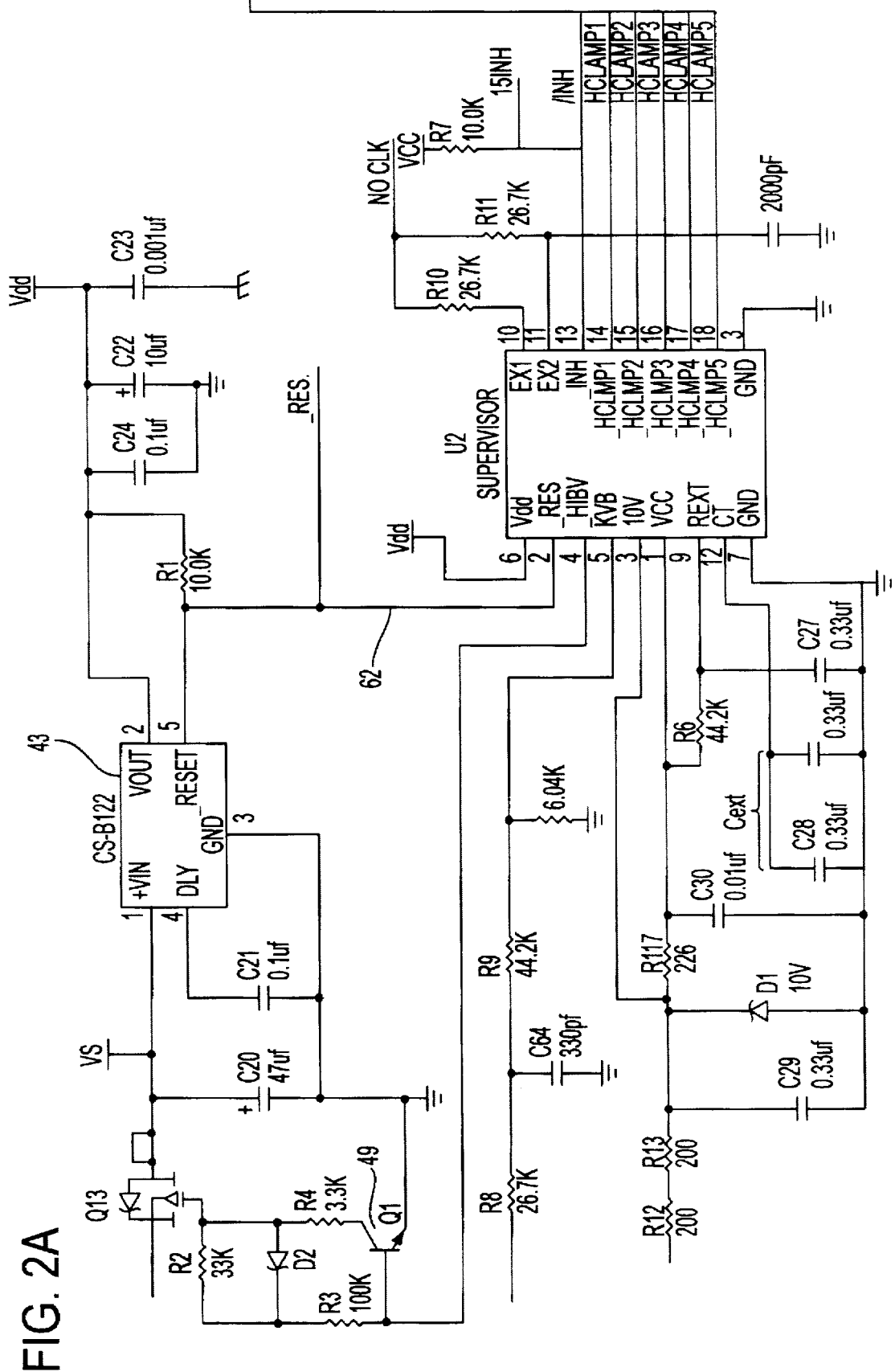
FIG. 2A is a circuit diagram illustrating a series electronic switch associated with the supervisory integrated circuit of FIG. 2.

Referring to FIG. 2A, an external voltage reference source 43, such as voltage regulator model No. CS-8122, is normally equipped with a reset output signal, /RES, which is, in most cases, a current sink to ground. The /RES signal is generated by the Vdd source to ensure orderly power up and power down of the ECU when Vdd is less than +5 V. The /RES signal is also used to cause all solenoid clamp output lines CLP1–CLP5 to become low when the /RES signal is also low.

Figure 3:
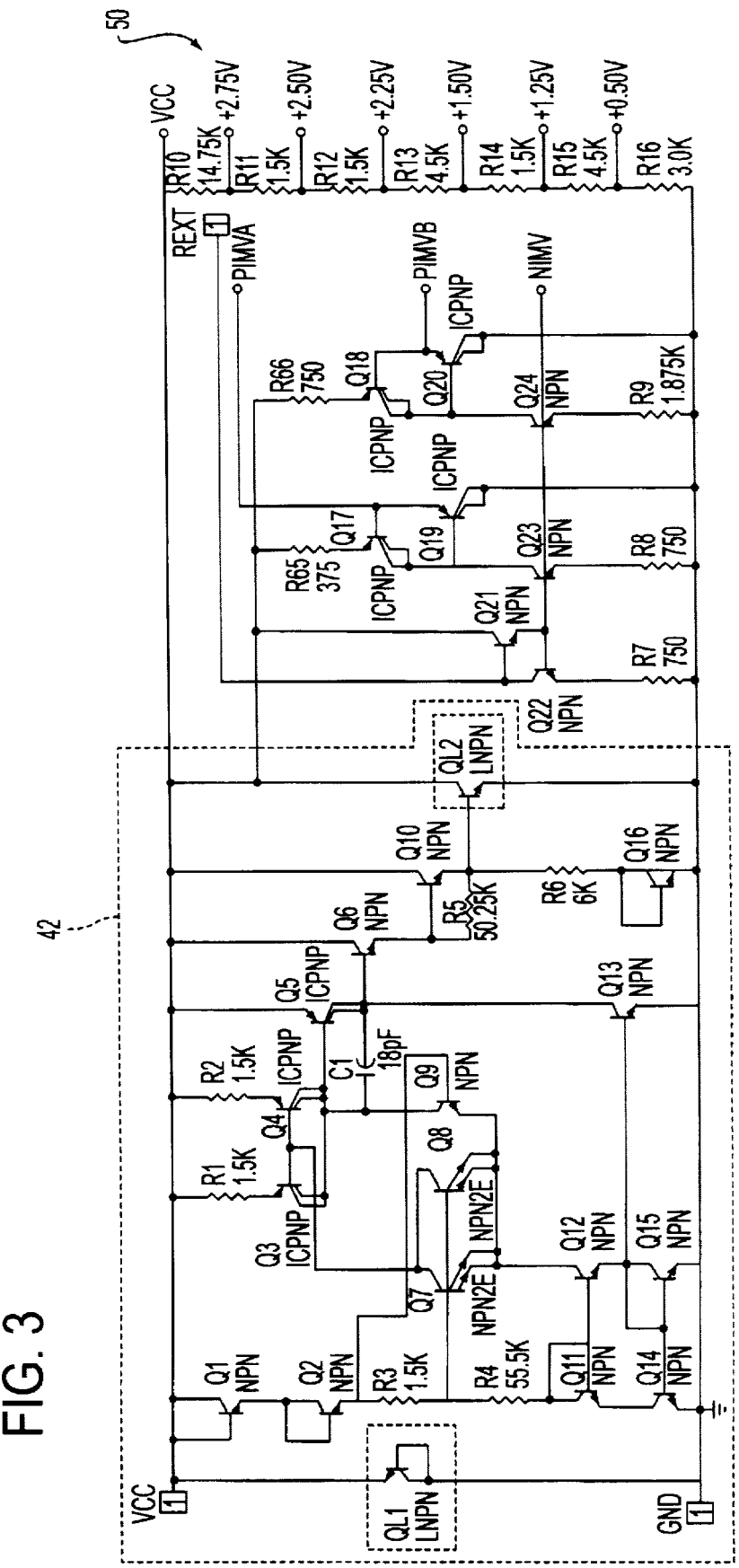
FIG. 3 is a circuit diagram illustrating certain circuit components shown in FIG. 1 in more detail, including a circuit independent voltage reference source and part of a watch-dog timer.

Referring to FIG. 3, the reference source 42 includes a band-gap reference source preferably consisting of a circuit including transistors Q1–16 and large NPN transistors QL1–2. Such a circuit is well known and provides a firmly stabilized nominal voltage source of 5.16 V for the rest of the ASIC.

A number of reference lines are derived from the reference source; particularly important lines are the centrally generated current mirror control voltages, NIMV, PIMVA and PIMVB. Current values for these three lines are determined by a common external resistor, $R_{ext}$, connected between the Vcc and $R_{ext}$ pins of the ASIC. As shown in FIG. 2A, the current through $R_{ext}$ drives approximately 85 uA into NPN current mirror transistors Q21–22 and the common point of Q21-emitter and Q22-base controls the current through all NPN current mirror transistors. The current through the subsequent current mirror transistors can be controlled by the appropriate sizing of the associated emitter resistors. As long as the resistor values are about 750 ohm, the lines will mirror the 85 uA current. Larger emitter resistor values reduce the mirrored current amplitude and smaller values increase it.

The base voltage of all subsequent NPN current mirrors is the common NIMV line. As shown in FIG. 3, the 85 uA current is mirrored to transistor Q23, whose current is transposed to the Vcc line by PNP transistors Q17 and Q19 and resistor R65. The common point of Q17-base and Q19-emitter is PIMVA, which includes the common current mirror control voltage for all PNP current mirrors. The mirrored current is approximately 85 uA as long as the emitter resistance of the subsequent PNP transistors is 375 ohm. A current of approximately 40 uA is mirrored by NPN transistor Q24 to PNP transistor current mirror Q18 and Q20. The mirrored current amplitude is reduced because the emitter resistor value of Q24 is increased from 750 ohm to 1.875 kohm. Transistors Q18 and Q20 control PIMVB control line. As long as the emitter resistor value of the current mirror transistors driven by that line is 1.875 kohm, the mirrored current will be approximately 40 uA.

Figure 6:
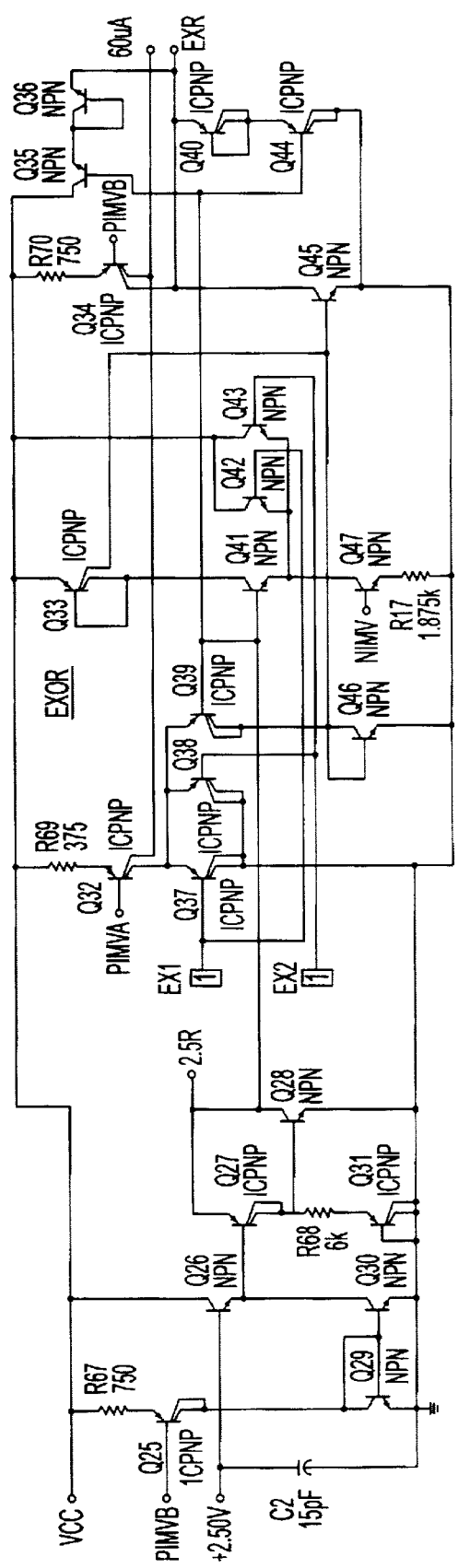
FIG. 6 is a circuit diagram illustrating certain circuit components shown in FIG. 1 in more detail, including a part of a watch-dog timer.

Still referring to FIG. 3, several voltage lines are used in different parts of the ASIC. As shown generally at 50, the values of these lines are: 2.75 V, 2.50 V, 2.25 V, 1.5 V, 1.25 V and 0.5 V. With the exception of the 2.5R line all those voltages are derived from the very stable Vcc supply by the R10–16 resistive voltage divider. An additional tap on the voltage divider 2.50 V is used to derive the 2.5R through buffer transistors Q25–Q31 (FIG. 6). The +2.50 V line is connected to complementary emitter followers Q26 and Q27. By this arrangement the base-emitter voltage drop of transistor Q26 is compensated by that of Q27, which is in the opposite direction. The emitter load of Q26 is provided by current mirror transistors Q25, Q29 and Q30 at a constant 40 uA bias. The current sinking capability of transistor Q27 is boosted by Q28 which is driven by the voltage drop across resistor R68 and transistor Q31 (connected as a diode).

High Battery Voltaae Detector

Referring to FIG. 2, the high battery voltage detector 44 preferably includes a comparator CMP1 internally referenced to +1.5 V. The battery voltage $V_{BAT}$ is attenuated by an external voltage divider so that when $V_{BAT}$ exceeds 17.5 V, CMP1 is activated and causes all clamp outputs CLP1–CLP5 to become low (active state). Another output, /HIBV is also generated in response to $V_{BAT}$ exceeding 17.5 V. This output goes low and shuts down the series electronic switch 49 shown in FIG. 2A preceding the system regulator 42 to protect the rest of the ECU from the stress imposed by a load dump pulse. If either of the resistors R1, R2 (which are preferably 26.7 kohm and 44.2 kohm, respectively) becomes open circuited (or disconnected from the ECU), another comparator, CMP2, is activated clamping lines CLP1–CLP5 but not the /HIBV line.

Figure 4:
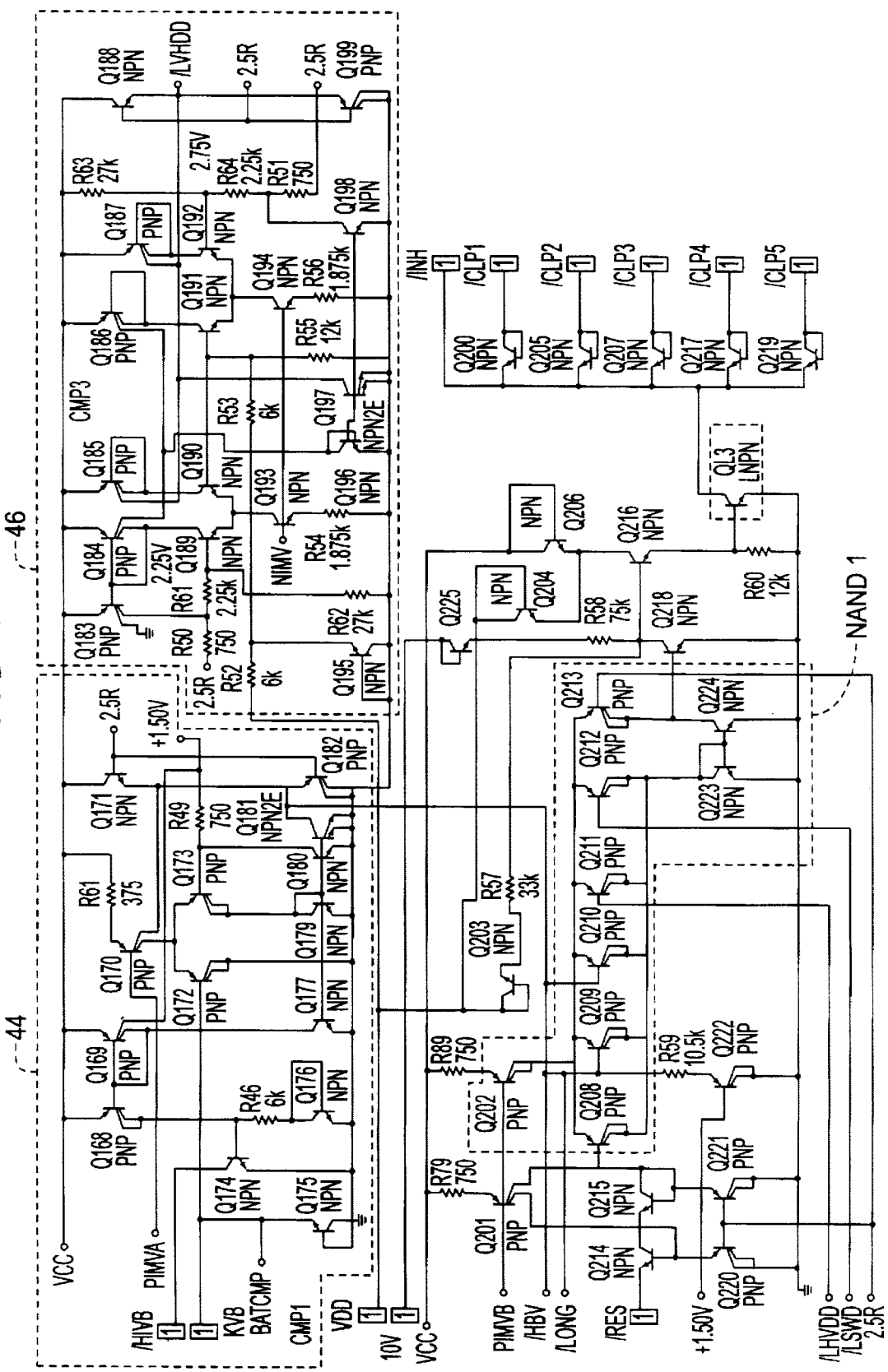
FIG. 4 is a circuit diagram illustrating certain circuit components shown in FIG. 1 in more detail, including a first part of a high battery voltage detector and a high/low system voltage detector.

Referring to FIG. 4, the high battery voltage detector 44 consists of transistors Q168–182 shown generally as CMP1 in FIG. 1. The actual comparator CMP1 consists of common emitter differential PNP transistors Q172–3 with emitter current source from Q170. Only half of the mirrored current of Q170 (approx. 42 uA) is used in the differential comparator circuit. When Q173 is non-conductve, current mirror Q179, Q177, Q180 and Q181 turns off and the mirrored current through the other half of Q170 drives the output of the comparator positively by one base-emitter voltage drop above 2.5R (approximately to 3.2 V). As shown in FIG. 4, the comparator output is at the common junction point of collectors of Q170 and 0181, emitters of Q171 and Q182, base of Q210 and line /HBV. The positive voltage level of the comparator output is limited by transistor Q182 which is connected as an emitter follower with its base referenced to 2.5R. Since PIMVA is a bus line controlling many other PNP current mirrors, saturation of any of the current mirror transistors must be avoided.

Still referring to FIG. 4, as long as the voltage at the "KVB" pin of the ASIC is less positive than 1.5 V (which corresponds to VBAT≦17.5 V), transistor Q172 conducts all the current supplied to it by Q170. When KVB>1.5 V, the emitter current flows to Q173, which in turn activates current mirror Q179, Q180, Q181 and Q177. The current of Q177 is mirrored to PNP current mirror Q169 and Q168. Q168 doubles the mirrored current of Q169. The current of Q168 drives the base of Q174 through bias circuit of R48 and Q176 and turns on transistor Q174. Q174 is the transistor which provides a current sink at /HIBV output when the battery voltage exceeds the maximum permissible limit.

When the /HIBV is near ground potential, the series electronic switch between $V_{BAT}$ and the 5 V regulator input is turned off. Current mirror Q179 also activates transistor Q181, which multiplies the current of Q179 because Q181 is a double emitter transistor. The current sunk by Q181 exceeds the pullup current supplied by current mirror Q170 at the comparator output. Thus, when KVB>1.5 V, the comparator output changes state and becomes low. Saturation of Q181 is prevented (for similar reasons outlined above) by emitter follower Q171 referenced to 2.5R. Thus, in a low state, the comparator output is at approximately 1.8 V. Finally, the current of Q179 is also mirrored by Q180 to the terminal of resistor R49, which is connected to the base of Q173 and the collector of Q180. This provides some hysterisis to the comparator circuit by adding 40 uA×750= 30 mV to the input voltage of the comparator, which corresponds to a 380 mV increase in the battery voltage level (considering the attenuation between KVB input and battery voltage). The +1.50 V reference used in the high battery voltage comparator CMP1 is taken from a high impedance voltage divider as shown in FIG. 2. The 40 uA current drawn through R49 (FIG. 4) also flows through the reference voltage divider at the +1.50 V tap. That current is replenished by the mirrored current from current mirror Q169. Thus, no appreciable current is taken out of the voltage divider at its +1.50 V tap. The 380 mV hysterisis makes the switching of CMP1 much more definnte and less sensitive to noise present on the battery line. Filtering is also provided by capacitor $C_{KBV}$ (FIG. 2) which is part of the attenuator circuit preceding KVB input. The value of $C_{KBV}$ depends on the rise time of high amplitude noise pulses, like the load dump pulse. Also, as shown in FIG. 2, a 5.9 V Zener-diode is also connected between the KVB input and ground to provide protection in case a 6.04 kohm external resistor 70 connected between the KVB input and ground becomes open circuited.

Figure 5:
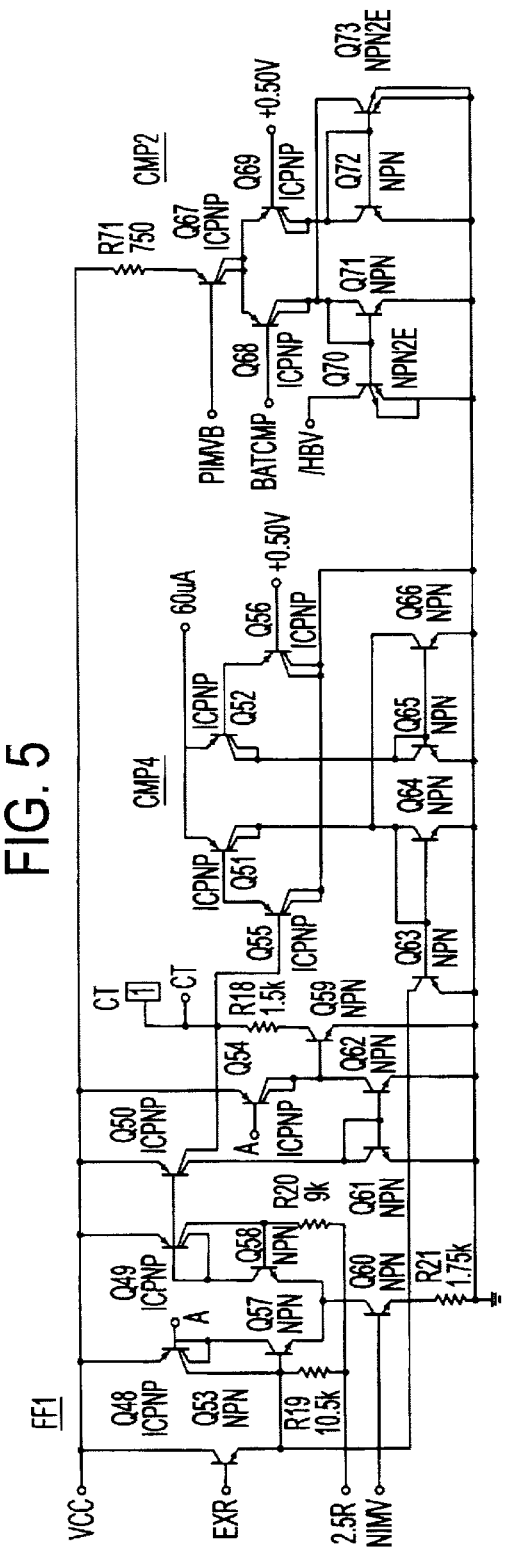
FIG. 5 is a circuit diagram illustrating certain circuit components shown in FIG. 1 in more detail, including a second part of a high battery voltage detector and a part of a watch-dog timer.

If any of the series resistors in the attenuator mentioned above was to become open circuited, the supervisory ASIC would not be capable of detecting high battery voltages. To prevent this situation, another comparator, CMP2 (FIG. 2), is used to detect KVB input loss. This comparator is shown in FIG. 5. The comparator preferably consists of transistors Q67–73 and resistor R71. Common emitter differential transistors Q68–9 are supplied by Q67 current mirror transistor (40 uA). As long as the input to KVB is more positive than 0.5 V, transistor Q69 conducts the 40 uA current activating current mirror transistors Q72–73. This state corresponds to an ABS unit battery voltage value of 6.37 V or more (less the switching hysterisis). Transistor Q73 goes into deep saturation, thereby clamping the collector of Q68 to ground. Thus, current mirror Q70–71 is deactivated. During the transition when Q68 begins to conduct and Q69 is being turned off, the current density through Q68 must be twice as high as through Q72 because of the positive feedback action of Q73; this will produce an approximate 36 mV hysterisis at the switching point (450 mV referred to battery voltage). Loss of KVB input is detected, therefore, as long as the battery voltage is less than 5.9 V. When the comparator state changes, transistor Q68 conducts all the emitter current, current mirror Q70–71 is active and current mirror Q72–73 is inactive. The current of Q71 is multiplied by two through the double emitter transistor Q70. Since the current of Q70 provides an 80 uA sink in line IHBV against a 40 uA pull-up, /HBV becomes low; saturation of Q70 is prevented by transistor Q171 (see FIG. 4).

Comparators CMP1 and CMP2 form a window comparator. When the battery voltage is outside the limits of 5.92 V and 17.5 V, /HBV will be low causing the output of the 5-input NAND gate (NAND1) in FIG. 4 to become high, allowing the clamp outputs and /INH to become low.

System Voltage Detector

Referring to FIGS. 2 and 4, the highlow system voltage detector 46 is comprises a window comparator CMP3. The system supply line, Vdd, is internally attenuated by a factor of 2. The comparator CMP3 compares the resulting attenuated voltage, nominally 2.5 V, to a +2.75 V reference and a 2.25 V reference. Thus, the operating range for Vdd is defined by: $4.5 \text{ V} \leq \text{Vdd} \leq 5.5 \text{ V}$. If Vdd falls outside this window, the clamp output lines CLP1–CLP5 and /INH become active (low). A 5.9 V Zener-diode is part of the attenuator should the series 5 V regulator fail, such as when its output is shorted to $V_{BAT}$.

The window detector CMP3 is shown in greater detail in FIG. 4 and comprises transistors Q183–199 and resistors R50–56 and R61-64. If Vdd is low, the transistors Q183–185, Q189–190 and Q193 of CMP3 detect this state. The attenuated Vdd is connected to the base of Q190. The base of Q189 is biased to 2.25 V by means of voltage divider resistors R50, R61 and R62. In the normal case, when 4.5 V<Vdd<5.5 V, transistor Q190 conducts current supplied by Q193 current mirror (40 uA). Current mirror Q185 is energized and Q184 is not.

If Vdd is high, transistors Q186–187, Q191–192 and Q194 of CMP3 detect this state. The attenuated Vdd is connected to the base of transistor Q191. The base of Q192 is biased to 2.75 V by means of voltage divider resistors R51, R63–64. When Vdd is within the permissible limits, Q192 conducts the current supplied by the Q194 current mirror (40 uA). Current mirror Q187 is energized and Q186 is not.

The combined currents of Q185 and Q187 pull up window comparator output line /LHVDD to approximately 3.2 V. Again, saturation of the active current mirrors is prevented by PNP emitter follower Q199 whose base is returned to 2.5R. It should be noted that the total pull-up current is 80 uA.

When Vdd is less than 4.5 V, the base voltage of Q190 is less than 2.25 V. Therefore, Q190 ceases to conduct and the current of Q193 is conducted by Q189. This switches off current mirror Q185 and energizes Q183–184 current mirrors. Current mirror Q183 provides positive feedback and shifts the switching point reference to 2.28 V. Current mirror Q184 energizes current mirror Q196–198. Current mirror Q197 doubles the sink current to 80 uA. However, the pull-up contributed by Q185 is not available, as it is only provided by Q187 (40 uA). The net effect is a 40 uA pull-down current. Thus, /LHVDD output drops to 1.8 V as a result of the clamping effect of NPN emitter follower Q188 whose base is returned to 2.5R. It should be noted that the current of Q184 is also mirrored to Q198 which tends to lower the reference voltage at the base of Q192 by 30 mV. This is of no consequence, for this happens when Vdd <4.5 V, i.e. the base voltage at Q190 is less than 2.25 V. Such a case does not affect the state of the other half of the window comparator CMP3 if its reference is not 2.75 V but only 2.72 V (corresponding to 5.74 V Vdd voltage).

When Vdd is greater than 5.5 V, Q191 and Q190 conduct their respective emitter source currents. Current mirror Q186 is activated mirroring its current to transistors Q196–198. The pull-up current of the /LHVDD comparator output line is only contributed by Q185 (40 uA) while the active transistor Q197 pulls down the same line with 80 uA. Thus, line /LHVDD will be logic low at 1.8 V due to the clamping effect of emitter follower Q188. This time the positive feedback represented by transistor Q198 is effective and changing the reference voltage from 2.75 V to 2.72 V produces a 30 mV hysterisis. The input signal to the window comparator, Vdd, is attenuated by resistors R52, R53 and R55. The reverse base-emitter break down voltage of Q195 provides the Zener-diode protection with approximately 5.9 V clamp voltage at the input.

Watch-Dog Timer

As shown in FIG. 2, the watch-dog timer 48 is activated through both the ECU 14 and the ASIC 15. The ECU 14 is programmed to continuously output a 50% duty cycle signal with a 15 millisecond (ms) nominal time interval between transitions into the ASIC 15 at pins EX1, EX2. The state changes, or transitions, of the duty cycle signal give rise to narrow, positive going pulses (EXR) as a result of the combined action of the exclusive OR- gate (EXOR) and the external components connected between ASIC pins EX1, EX2 and the ECU port supplying the watch-dog signal. The EXR pulses control the generation of a saw-tooth like waveform so that the positive peaks of the saw-tooth coincide with the positive leading edge of the EXR pulse. The discharge of the $C_{ext}$ capacitors is also initiated by the EXR pulses. The saw-tooth signal generation is controlled by comparator CMP4, flip-flop 1 (FF1), capacitors $C_{ext1}$ and $C_{ext2}$, a 40 uA current mirror 50 and a switched 1.5 kohm resistor R3 as shown in FIG. 2.

The positive leading edge of the pulse from the EXOR sets FF1, causing the termination of the 40 uA charge current into the $C_{ext}$ pin and the switching of the 1.5 kohm resistor between the $C_{ext}$ pin and ground. If the timing of the watch-dog signal is correct, the positive peaks fall between the limits of 1.25 V and 2.25 V. The level of the peaks is checked by a window-comparator CMP5. If the amplitude of the peaks is outside those limits, the output "GOOD" of CMP5 is at low logic level, while "/GOOD" is at a high logic level. This state is immediately stored in a set of registers FF2–5. The control logic of the registers is such that an error is latched immediately with the positive edge of the EXR pulse and all clamp outputs and /INH become low simultaneously. However, it takes two subsequent correct watch-dog periods to remove the latched error and thus the low state from the clamp and /INH outputs.

Referring now to FIG. 6, which shows the watch-dog timer 48 in more detail, the timer 48 includes the EXOR gate formed by transistors Q32–47 and resistors Ri 7, R69–70. Transistors Q32, Q37–39 and Q46 form an AND-gate. If both EX1 and EX2 inputs are positive, current mirror Q45–46 is activated by the current injected by Q39. Transistors Q33, Q41–43 and Q47 form a NAND-gate. If both inputs are negative, current mirror Q45–46 is activated by a current flow injected from Q33. An input is positive if greater than 2.5R+0.01 V and negative if less than 2.5R-0.01 V. Half of the current of mirror transistor Q32 (40 uA) is the common emitter current to transistors Q37–39. Since transistor Q39 is referenced to 2.5R, if both base voltages to Q37–38 are positive, those transistors are shut off and the emitter current flows through Q39. The current mirror transistor Q47 injects 40 uA current into the common emitters of transistors Q41–43. If both base voltages of Q42–43 are negative, all current flows through transistor Q41. This activates current mirror Q33, which inputs its current to the same point as Q39.

The EXOR output is biased positively by 20 uA supplied by half of the current from mirror transistor Q34. When Q45 is inactive, current mirror saturation is prevented by Q40 and Q44 PNP transistors connected as emitter follower and diode, referenced to 2.5R. Thus, the highest positive level EXR can attain is approximately 3.9 V. The above condition can only exist when the two inputs EX1 and EX2 are unequal. For example, if EX1 is positive and EX2 is negative, PNP transistor Q38 conducts all the common emitter current supplied by Q32 and Q42 carries all the current supplied by Q47. As a result, both Q39 and Q41 are turned off. Therefore, no current is injected into the Q45–46 current mirror. Further, a 20 uA pull-up current biases the pulse to its positive peak value of 3.9 V. When the input signals are equal (both positive or both negatve) either Q39 or Q33 injects current into the Q45–46 current mirror. In either case, the injected current is 40 uA and the current mirror transistor Q45 sinks current from the pulse. Since the pull-up is 20 uA and the sinking is 40 uA, there is a net 20 uA sinking current acting on the EXOR output.

The saturation of the EXOR output in its negative state is prevented by Q35–36 emitter follower diode pair and the signal is clamped 1.4 V below 2.5R at 1.1 V. Thus, the pulse is symmetric about 2.5R and its ultimate amplitude is 2.8 V.

The timing of the EXR pulse is illustrated in FIGS. 7A–7C. As shown at 52 in FIG. 7A, input EX1 is connected to the watch-dog pulse port through a 26.7 kohm resistor, resulting in negligible delay at EX1. As shown at 54 in FIG. 7B, EX2 is delayed by means of a 26.7 kohm series resistor and a 2000 pF capacitor to ground (53.4 microsecond time constant). The two signals, EX1 and EX2 are unequal during the shaded portion of the EX2 waveform and the width of the EXR pulse shown at 56 in FIG. 7C, notches that time. The above time constant sets the pulse width of the EXR at approximately 35 $\mu$s. It should be noted that the positive leading edges of the EXR pulse coincide with the transitions at EX1, which are the transitions of the watch-dog pulses.

Referring back to FIG. 5, the flip flop FF1 is shown in more detail. The saw-tooth time base of the watch-dog timer 48 is generated as follows. Flip-flop FF1 controls charging of the $C_{ext}$ timing capacitors from a 48 uA constant current source. The control of the 1.5 kohm discharging resistor consists of transistors Q48–50, 053–54, Q57–62 and resistors R18–21. The FF1 is set with the positive EXR pulse when the pulse amplitude is more positive than 3.65 V. During generation of the saw-tooth the flip-flop, consisting of transistors Q48–49, Q57–58 and Q60, is in the reset state. The current mirrored by Q60 (approximately 48 uA) is conducted by Q58 activating current mirrors Q49 and Q50. 049 mirrors the 48 uA current back to the base which returns to 2.5R through resistor R20. The base voltage of Q58 is 2.932 V. During this time EXR is low, transistor Q53 is back-biased and the base voltage of Q57 is 2.5 V, thereby turning off Q57. The current of Q49 is mirrored by Q50 into two different paths: 48 uA charges $C_{ext}$ through pin CT and 48 uA is injected into current mirror Q61–62. Since Q48 is not conducting, Q54 is not conducting and the base of Q59 is pinched to ground by the saturated transistor Q62. It should be noted at this point that the current sink output of comparator CMP4 at Q63 is also zero because the voltage at CT is more positive than +0.50 V.

When the EXR pulse is generated its peak amplitude is 3.9 V. Thus, the emitter voltage of Q53 is at least 3.15–3.2 V, which is enough to overcome the reset level of 2.932 V. Flip-flop FF1, which is in the set state energizing Q48 current mirror, injects 48 uA into resistor R19 holding the base potential of Q57 at 3 V after the EXR pulse is turned off. The base bias of Q57 keeps Q58 turned off. Thus, the 48 uA charging current into pin CT is cut off. Since current mirror Q48 is on, transistor Q54 mirrors twice the current of Q48 (96 uA) into the base of Q59. When current mirror Q49 is turned off transistor Q62 is also turned off. Therefore, the full 96 uA current flows into the base of Q59. Transistor Q59 saturates which provides a 1.5 kohm discharge path between CT and ground. Capacitor $C_{ext}$ begins to discharge through the 1.5 kohm resistor. With a 15 ms watch-dog period, $C_{ext}$ is 0.66 uF. Thus, the time constant of the discharge path is approximately 1 ms, which is much longer than the width of the EXR pulse.

As long as the voltage at CT is more positive than +0.50 V, the Q56, Q52 side of comparator CMP4 conducts 60 uA of common emitter current generated by some of the excess current mirror capacity in the EXOR circuit. This activates current mirror Q65–66. Since the Q55–Q51 side of the comparator is not conducting, transistor Q66 is in deep saturation, thereby disabling current mirror Q64–63. However, cross-coupling Q66 to the collector of Q51 causes an 18 mV hysterisis in the switchover voltage range between Q51–52. When the voltage at CT is 20 mV below 0.5 V, comparator side Q55–Q51 conducts the 60 uA common emitter current. Transistors Q52, Q56, Q65–66 are switched off and current mirror Q64–Q63 is activated. Thus, 60 uA is pulled out of the base of Q57 through resistor R19. However, the self-biasing current of the flip-flop injects 48 uA into the base. Therefore, the net current pulled out of the base is 12 uA, making the initial base voltage 2.375 V. This voltage drop is sufficient to turn off Q57 and turn on Q58. As soon as Q57 begins to turn off and Q58 turns on, the positive feedback loop within the flip-flop circuit and the hysterisis in the comparator insures that the flip-flop ends up in the reset state (Q58 conducting) without any ambiguity or undesirable race conditions.

This method of generating the saw-tooth waveform provides several advantages. First, the waveform ramp always starts from the same initial voltage. Second, no race condition exists between charging and discharging the timing capacitors Cext. Also, narrow EXR pulses can be used to terminate the charge and initiate the discharge of Cext. Finally, the voltage margins are sufficiently wide to prevent noise sensitivity.

Watch-Dog Period Detector

As shown in FIG. 8, the watch-dog timer 48 includes a long/short watch-dog period detector including the window comparator (CMP5) consisting of transistors Q74–97 and resistors R23 and R72. The function of this detector is to generate a flag if the peak of the saw-tooth ramp is outside the 1.25 V–2.25 V voltage range.

For example, if the voltage at pin CT is between 1.25 V and 2.25 V, transistor Q84 conducts the 80 uA emitter current mirrored by transistor Q75, 40 uA of which is mirrored to transistor Q95. Because comparator side Q83 is not conducting by assumption, current mirror Q92 is not active and therefore no pull-up current is provided by transistor Q74. As discussed further below, current mirror Q78 is also inactive. Therefore, Q79 also will not supply any pull-up current. Thus, transistor Q95 sinks 40 uA current towards ground, thereby clamping output line /GOOD to ground.

In the other half of the window comparator, transistor Q85 conducts the common emitter current (40 uA) mirrored by transistor Q90, because the voltage at CT is less than 2.25 V by assumption. Therefore, current mirrors Q77–76 are energized while Q78–79 are turned off. Transistor Q77 supplies pull-up current for output line GOOD while both current mirrors, which could pull this line down, are turned off (transistors Q92–93 and Q97–96). Saturation of Q77 is prevented by emitter follower diode combination of Q88,80 referenced to 2.5R. Thus, output line GOOD does not exceed 3.9 V.

If voltage at pin CT is less than 1.25 V, conditions at the high window comparator side are as described above. However, on the low comparator side, transistor Q83 conducts the current mirrored by Q75 (80 uA). This current is mirrored to the GOOD output line as a pull-down current and to the /GOOD line as a pull-up current. There is no pull down acting on the output line /GOOD. Thus, the voltage level on this line is at 3.9 V due to the clamping effect of emitter follower-diode combination of transistors Q88–81, with Q88 being referenced to 2.5R. The GOOD output line is pulled up by 40 uA (Q77) and pulled down by 80 uA (Q93). The net effect is a pull-down current of 40 uA amplitude. Saturation of transistor Q93 is prevented by emitter follower-diode combination of Q82–89 referenced to 2.5R. Therefore, the GOOD output line is at a voltage level of 1.1 V.

If the voltage at pin CT is greater than 2.25 V, conditions at the low window comparator are as described above in conjunction with the voltage at pin CT being between 1.25 V and 2.25 V. On the high comparator side, transistor 086 conducts the common emitter current mirrored by Q90 (40 uA). Current mirror Q77–76 is turned off while current mirror Q78–79 is energized. Transistor Q79 mirrors twice the current of Q78 (80 uA) as pull-up current on the /GOOD output line while the pull-own current mirrored by Q95 is only 40 uA. The net effect is a 40 uA pull-up current. Saturation of Q79 is prevented by Q88–81 emitter follower-diode combination referenced to 2.5R. The current of Q78 also energizes current mirror Q97–96, which supplies a 40 uA pull-down current at output line GOOD. Since Q77 in the high comparator is not active, there is no pull-up current on output line GOOD. The pull-down current will not saturate Q96 because of the emitter follower-diode combination of Q82–89 referenced to 2.5R. The voltage on this line in this case will be about 1.1 V.

It has been shown that the two output lines GOOD and /GOOD are respectively high (3.9V) and low (1.1 V) if the voltage at pin CT is between 1.25 V and 2.25 V. The state of the output lines is opposite when the CT voltage is outside the limits.

Still referring to FIG. 8, the long/short watch-dog period detector may also be used for another function. If the watch-dog pulses cease to arrive after operating normally, the last EXR pulse initiates the discharge of the $C_{ext}$ capacitors through the 1.5 kohm resistor. When the voltage at the CT pin is less than 0.50 V, the saw-tooth generator automatically switches from discharge to charge. But if the watch-dog transition fails to arrive, $C_{ext}$ is charged until the current source (Q50) would saturates. The maximum amplitude at CT is limited to 3.2 V by diode Q87 connected between 2.5R and the bases of window-comparator transistors Q83 and Q86. In this case, however, transistor Q86 carries the common emitter current. Thus, current mirror Q76 is turned off, thereby switching off an 80 uA pull-up current. Thus, output line /LONG goes low. When output line /LONG goes low, it is one of the inputs at the output NAND gate that can cause the clamping outputs to become low.

Figure 9:
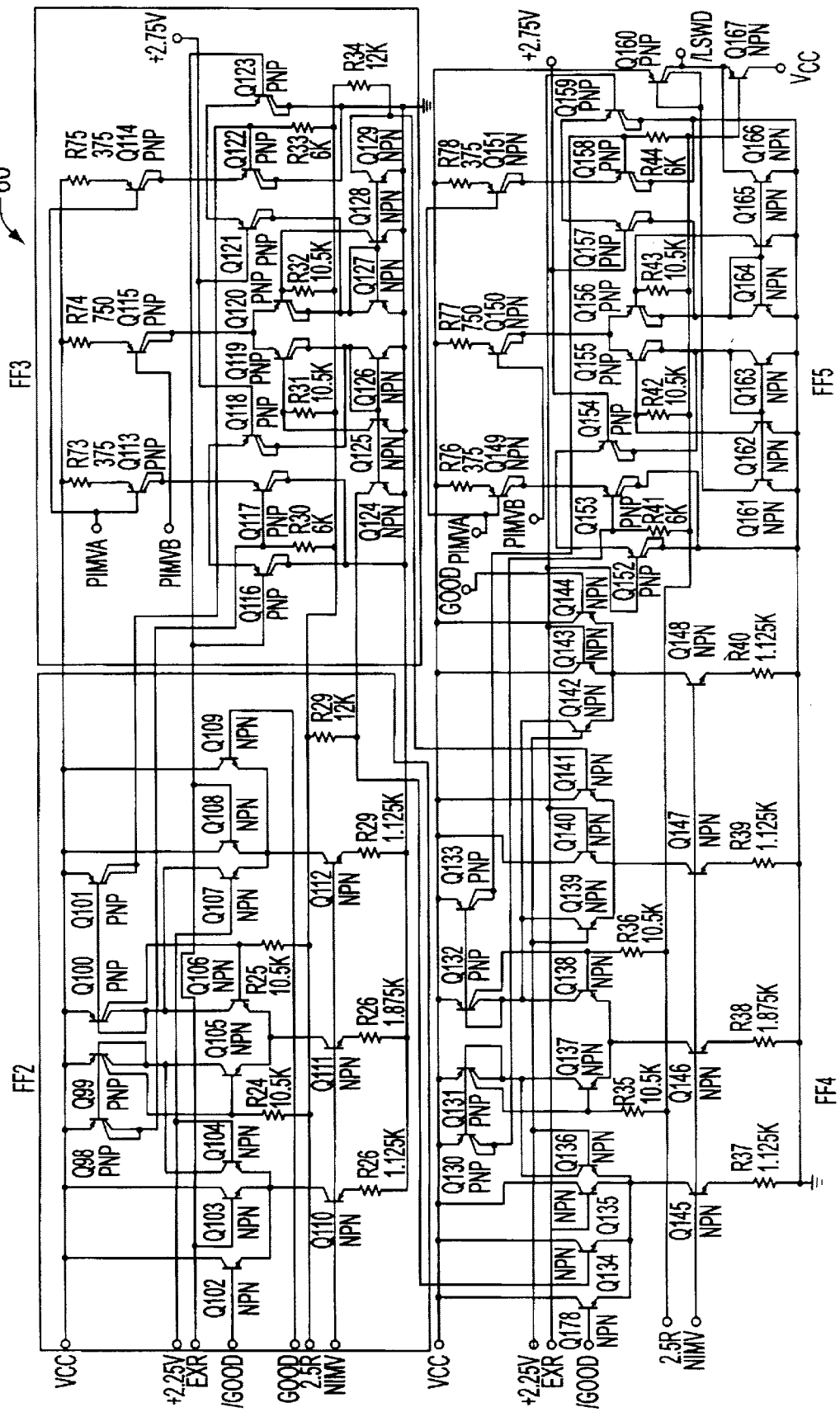
FIG. 9 is a circuit diagram illustrating a watch-dog timer error latch.

The watch-dog timer also includes a timing error latch shown at 60 in FIGS. 2 and 9. The basic function of the two-stage shift register is to latch a watch-dog error (when the voltage at CT pin is outside of the 1.25 V to 2.25 V band) at the leading edge of the EXR pulse. Should the proper watch-dog pulse sequence be reestablished, then it would take two transitions in a row with acceptable timing to remove the latched error from the registers.

The states of the GOOD and /GOOD window comparator output lines are gated through the input gates of FF2 and FF4. Those gates are enabled while the EXR pulse is in the low state, or less positive than 2.25 V, as EXR(low)=1.1 V as discussed above. The rising edge of the EXR pulse shuts down the gates to FF2 and FF4 once EXR is more positive than +2.25 V. At this point the states of the /GOOD and GOOD lines are latched into FF2 and FF4. It should be noted that the input gates to FF2 and FF4 are negative true. Thus, /GOOD=low and GOOD=high are the inputs to latch no error into FF2 and FF4. The gates between FF2 and FF3, and FF4 and FF5 are enabled when EXR is more positive than +2.75 V. Thus, the logic states are latched into FF2 and FF4 while the state of EXR, being less than 2.25 V, will be transferred to FF3 and FF5.

It should be noted that the gate arrangement between FF4 and FF5 is more complex than between FF2 and FF3. It is clear from the logic symbols that FF4 is reset if either FF3 is in the reset state or the /GOOD and GOOD lines flag an error at the time of the latch (i.e. when EXR becomes more positive than 2.25 V). On the other hand, FF5 will only be set if FF4 is in the set state when EXR is more positive than 2.75 V. This gating arrangement ensures that a faulty watch-dog period is latched immediately into both sets of registers, but the correct sequence of watch-dog pulses will clear the registers in two steps. The indication of a watch-dog error is by the /Q output of FF5. If this flip-flop is reset, output /Q5 goes low causing the /LSWD line to go low and thus activate the output clamps. The clocking and gating arrangement is also described in pending U.S. patent application Ser. No. 08/828,737, entitled "Clocked Register", which is assigned to the assignee of the present invention, and which is described hereinafter.

The state of the input lines, GOOD and /GOOD is latched into the first master flip-flop, FF2, when the amplitude of the EXR pulse is just greater than 2.25 V. There are more inputs determining the state of the second master flip-flop, FF4, but they are also latched at the same time as FF2. The state of the slave flip-flops FF3 and FF5 is only dependent on the state of the preceding master flip-flops, FF2 and FF4. Those states are gated into the slave flip-flops when the clock pulse, EXR, is more positive than 2.75 V, and are latched when EXR is less 2.75 V. While the amplitude of EXR is between 2.25 V and 2.75 V none of the gates associated with either the master or the slave flip-flops are enabled. Therefore, race conditions or ambiguous latching between master and slave flip-flops is prevented. In addition, all advantages of the emitter coupled logic and flip-flop circuits are fully exploited in this design. The fact that the slave circuit is complementary symmetric with respect to the master one yields substantial hardware savings.

As shown in FIG. 4, the watch-dog timer circuit controlling the clamp outputs also includes a /RESET line 62 which is a current sink and which is selectively enabled by the +5 V system voltage reference source. Preferably, a pull-up resistor is located between the /RESET line and the +5 V line (preferably about 10 kohm). When /RES is high, the 2×20 uA pull-up currents supplied by Q201 (FIG. 4) are blocked to /RESET input by diodes Q214–215. Both current branches are returned to ground through emitter followers Q220–221 referenced to 2.5R. Thus, the collectors of Q201 are at +3.2 V (logic high). When /RES is at ground potential, the base-collector of Q214 is at 0.7 V and that of Q215 is at 1.4 V, causing the base of Q208 to be at logic low (i.e. less positive than 2.5R) but preventing the saturation of Q208, as the base of Q208 is more positive than its collector. /RESET=low causes all clamp outputs to be low.

Clamp Output Lines

Figure 10:
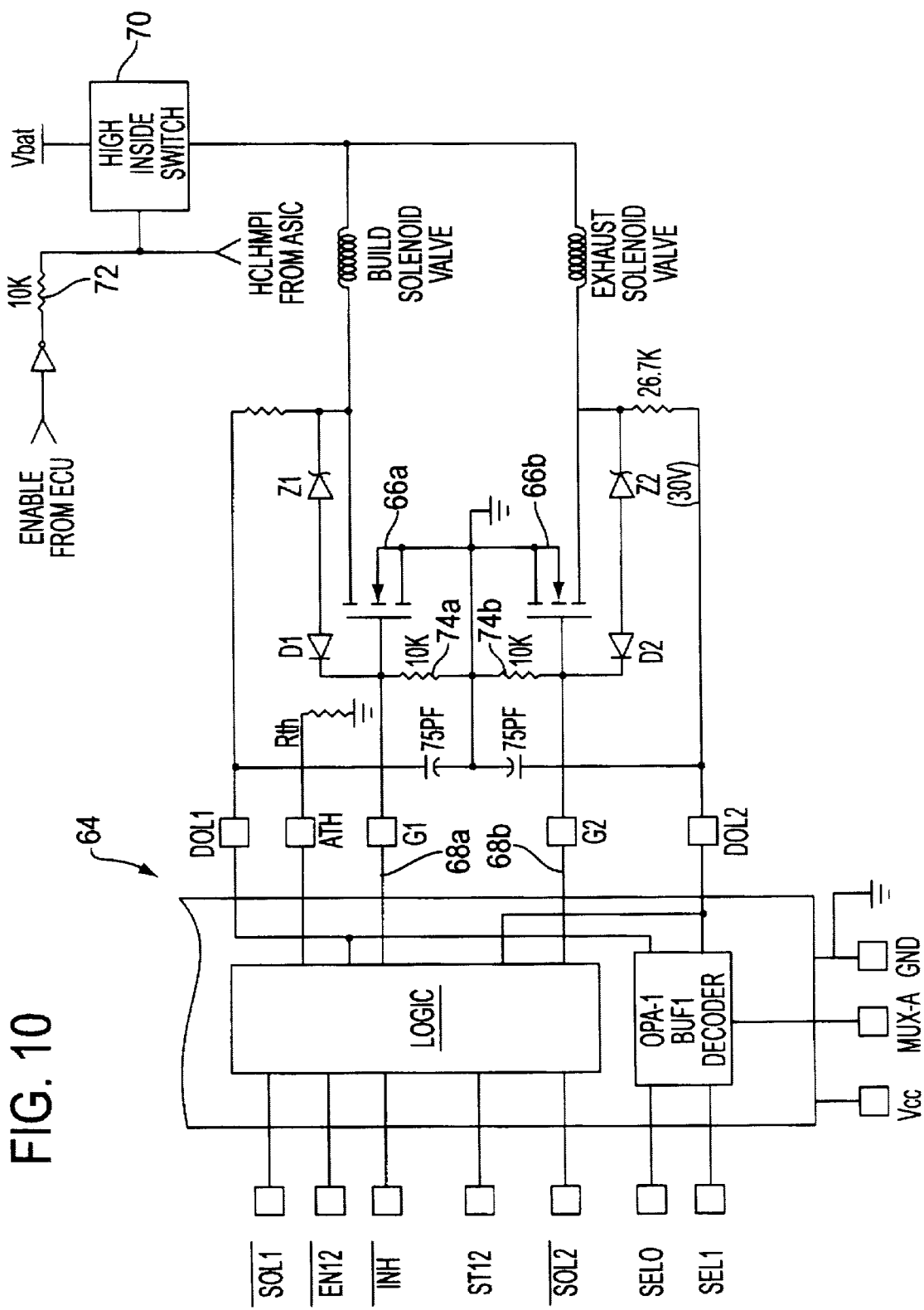
FIG. 10 is a circuit diagram illustrating a solenoid driven interface ASIC and associated circuit components.

Referring in more detail to the clamp output lines shown in FIG. 4, the 5 input NAND-gate consists of transistors Q202, Q208–213 and Q222–224 as shown in FIG. 4. When inputs to all five NAND gate transistors Q208–212 are high (more positive than 2.5R) the 40 uA current mirrored by Q202 into the common emitters of transistors Q202–213 flows through Q213. Since no current is flowing through any of the Q208–212 transistors, current mirror 0223–224 is not energized and all the current of Q213 flows into the base of Q218. Q218 turns on into saturation sinking to ground approximately 215 uA from the two voltage sources ("10 V" and Vdd) under normal operating conditions. Thus, Darlington-transistor pair Q216 and QL3 is turned off, thereby switching off the output clamp currents. In particular, the clamp output lines CLP1–CLP5 and /INH (FIGS. 1 and 4) output clamping signals in response to ABS error signals received from one of the components discussed above. The clamp output lines and /INH are capable of sinking at least 50 mA (i.e. 8.3 mA each) as long as either Vdd or Vcc are present. Since double errors are not considered, the clamping lines are always powered to sink the maximum current. A direct connection to the collector of a current sinking transistor /INH also exists. This line is connected to a Solenoid Driver ASIC 64 shown in FIG. 10, and as disclosed in pending U.S. patent application Ser. No. 08/583,946, which is incorporated by reference, and clamps four gates of N-channel low-side switching field-effect transistors (FETs) 66a, b through the solenoid driver ASIC and further provides a logic input to turn off the positive gate driving signal in each of the channels 68a, b. The other set of outputs, /CLP1–5, presents a logic low input to the high-side solenoid driver switches such as the switch 70 used for the four ABS modulators and the traction control modulator (if installed in the system). The high-side solenoid drivers require a logic high to be turned on and are connected to corresponding control inputs 72 through a high impedance path (typically 10 kohm) from the micro controller ports. Outputs /CLP1–5 can therefore clamp the "on" control voltages when connected to the high-side driver input ends of the series 10 kohm resistors 74a, b.

Reference is now made in particular to the NAND-gate /LONG input shown in FIG. 4. Because the /LONG input is connected to an 80 uA current mirror and is always turned on, unless a long watch-dog period is detected, the voltage at the /LONG line is at least 3.0 V when the 80 uA current mirror is active (transistor Q76 in FIG. 8). The /LONG input is biased by the 80 uA current injected into resistor R59 (10.5 kohm) returned to the emitter of a PNP emitter follower (Q222), whose base is referenced to +1.50 V. The emitter of Q222 is at approximately +2.2 V and the base voltage of Q209 is +2.2 V+(10.5 kohm×80 uA)=3.04 V. However, when the 80 uA current is turned off, as it is in case of a long watch-dog period, the voltage at the base of Q209 drops to +2.2 V, causing Q209 to be switched on and Q213 to be switched off.

When any of the Q208–212 transistors are switched on the common emitter current supplied by Q202 is carried by the conducting transistor in that group, causing the Q223–224 current mirror to be activated and Q213 to switch off. Now, the base current supply to 0218 is cut off and the base is clamped to ground by the saturating current mirror transistor Q224. The base of Q216 is no longer clamped to ground but is driven from the "10 V" and Vdd supplies through the respective series resistors (R57 and R58). The input transistor of the Darlington-transistor pair takes its supply voltage either from Vcc or Vdd through transistors Q204 and Q206. Output transistor QL3 is driven into its high current sinking mode of operation. Clamping output /INH is directly connected to the collector of the output sink while clamp outputs /CLP1–5 are connected through diodes Q200, Q205, Q207, Q217 and Q219.

As can be appreciated from the foregoing description, the supervisory integrated circuit of the present invention monitors ABS unit operating conditions and inhibits unit activation if one or more unit operating parameters deviates from predetermined threshold levels. The circuit, through its design, ensures that only a properly operating ABS unit is capable of being activated upon sensing of braking conditions, thereby minimizing the chance of activation of a malfunctioning unit.

Clocked Register

Figure 11A:
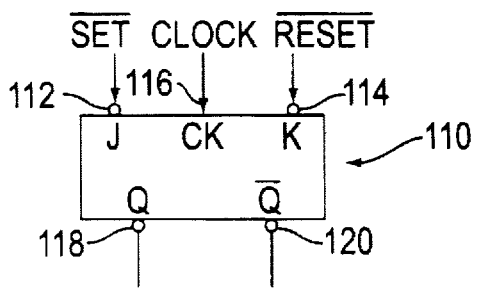
FIG. 11A is a schematic representation of the J-K flip/flop of the present invention.
Figure 11B:
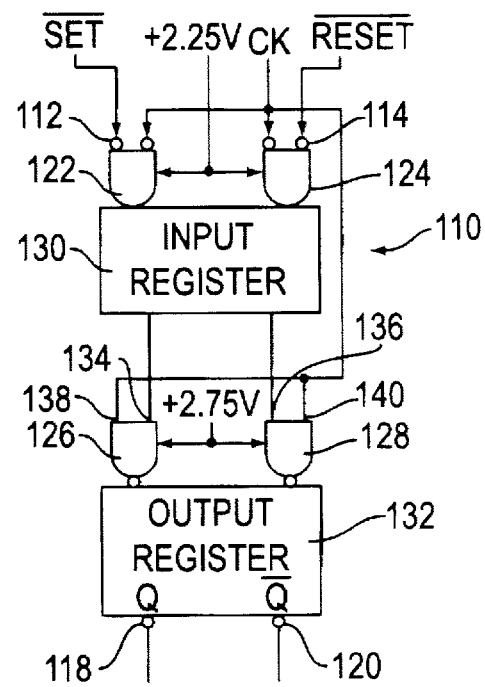
FIG. 11B is a logic representation of the J-K flip/flop of the present invention.

Referring now to FIGS. 11A and 11B, the flip flops FF2 and FF3 are illustrated in greater detail and denoted by reference numeral 110. The register 110 includes a SET input 112, a RESET input 114, a clock input 116 and outputs 118 and 120. With specific reference to FIG. 11B, a clock signal is applied to each one of a pair of two input AND-gates 122 and 124, as well as to one input of each of a pair of AND-gates 126 and 128. AND-gates 122 and 124 are associated with an input register 130 while AND-gates 126 and 128 are associated with an output register 132. Each one of AND-gates 126 and 128 have an input 134 and 136, respectively, which form inputs to the output register 132. Inputs 138 and 140 form clock inputs to the output register 132.

With further reference to FIG. 11B, the first or input register stage 130 is active during the inactive state of the clock pulse. This is when the clock pulse is at a logic 0 (or less positive than 2.25 V input level). At this time the inputs to the second or output stage are inhibited. In this state the logic inputs /SET and/RESET are continually setting and resetting the input register 130 as they are changing in time. Notice, that preferably, but not necessarily, /SET=/(/RESET) and /RESET=/(/SET). In other words the /SET and /RESET inputs are logical complements of each other.

As the clock pulse amplitude changes from a level less than 2.25 V (logic 0) to a level more positive than +2.75 V (logic 1), the inputs 112 and 114 to the input register 130 are inhibited when the clock pulse exceeds the 2.25 V level. When the clock pulse amplitude is +2.75 V or greater, the AND-gates 126 and 128 of the output register 132 are enabled and the state of the input register 130 previously copied from its inputs 112 and 114 are copied into the output register 132. As long as the clock pulse level is more positive than +2.25 V the state of the input register 130 is impervious to the states of the /SET 112 and /RESET 114 inputs. As the clock pulse is changing from a level more positive than +2.75 V to a level less positive than +2.25 V, i.e. from logic 1 to logic 0, the state of the output register 132 is frozen and the inputs 112 and 114 to the input register 130 are enabled again.

An important feature of the register 110 is that between logic 0 (>+2.25 V) and logic 1 (>+2.75 V) there is a neutral voltage zone of 0.5 V. As long as the clock pulse state is in the neutral zone neither register 130 or 132 is active. Therefore, race conditions, accidental triggering by noise etc. are prevented. The logic shown in FIGS. 11A and 11B is readily realizable by bi-polar, CMOS or any other well known semiconductor devices.

When both /SET and /RESET inputs are logic 1 (>+2.75 V), the state of the input register 130 will correspond to the last unequal /SET and /RESET inputs 112 and 114, respectively, at logic 0 clock input. This is because /SET=/ RESET=logic 1, which case inhibits the input gates 112 and 114 of the input register 130. When both /SET and /RESET are low, both sides of the input register 130 want to store a logic 1, and the side with a slight edge over the other will determine the state as the clock amplitude becomes more positive than +2.25 V. In other words, the response to this input configuration is unpredictable.

Figure 12A:
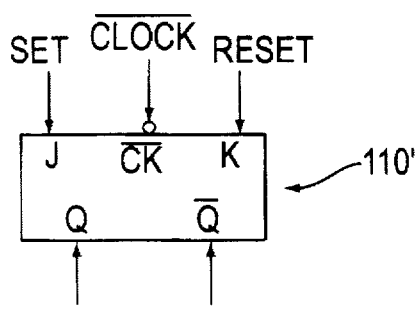
FIG. 12A is a schematic representation of a J-K flip/flop in accordance with an alternative preferred embodiment of the present invention incorporating positive true logic inputs and a negative true clock pulse.
Figure 12B:
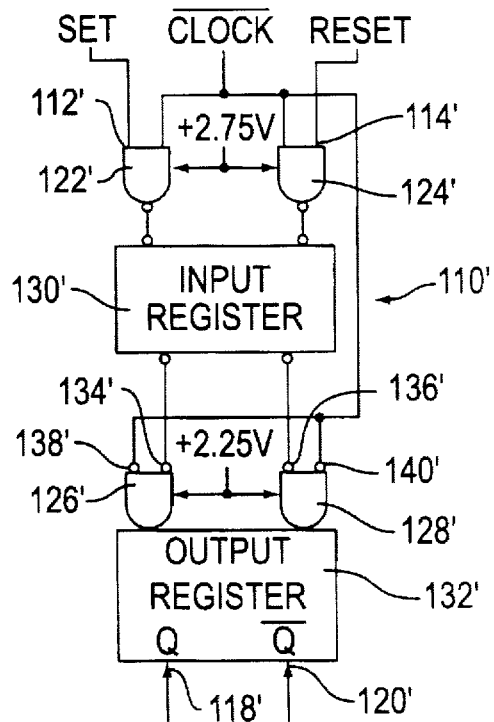
FIG. 12B is a logic diagram of the J-K flip/flop of FIG. 12A.

With brief reference to FIGS. 12A and 12B, an alternative embodiment 110' is illustrated which forms the complement of the register 110. Here the SET and RESET logic inputs 112' and 114', respectively, are positive true and the clock pulse changes from logic 1 (>+2.75 V) to logic 0 (<+2.25 V). All statements and observations made previously will apply in the opposite logic states.

The presently preferred circuit implementation of the register 110 is with a bi-polar linear array. This type of array features a large number of transistor cells which can be configured either as multi-emitter NPN transistors or multi-collector PNP transistors by means of a metal mask. In addition, there are on the die other NPN transistors, large current NPN and PNP transistors and a plurality of resistors of the same value. A plurality of the linear arrays are fabricated on a silicon wafer and the fabrication process is completed except for the step of the inter-connection of the individual transistor cells and resistors corresponding to the custom designed circuit diagram. A metal mask pattern is designed corresponding to the custom circuit and metallization is deposited on the pre-fabricated wafer.

This type of circuit implementation represents the presently preferred practice to realize the invention. However, full custom design CMOS (complementary metal-oxide silicon) linear arrays and full custom CMOS or any combination of bi-polar and CMOS circuits are feasible. Thus, it will be appreciated that the invention may be implemented in a variety of forms.

Figure 13:
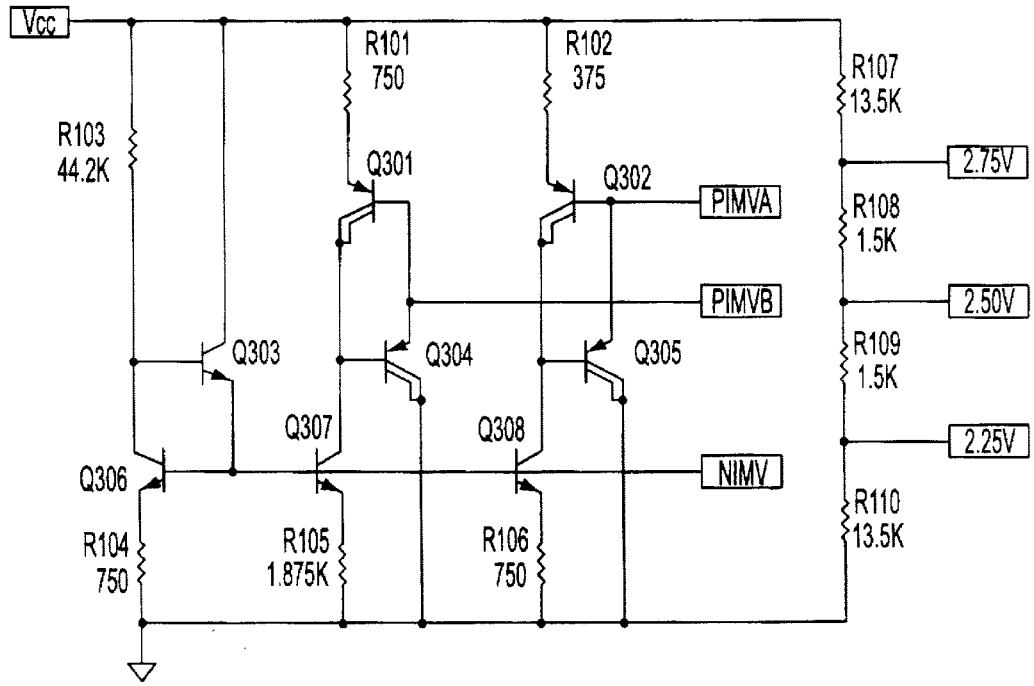
FIG. 13 is a schematic diagram of a circuit for generating the voltages used by the J-K flip/flop of the present invention.

Referring now to FIG. 13, the circuit implementation of both registers 110 and 110' requires the same voltage supply circuit shown in FIG. 13. Supply voltage Vcc is equal to +5.0 V, and reference voltages 2.75 V, 2.50 V and 2.25 V are derived from the resistive voltage divider R107–R110.

Resistors R111–116 and transistors Q301–308 generate current mirror voltages to be used in the actual registers 110 and 110'. Resistors R103–104 and transistors Q300 and Q306 define voltage line NIMV (NPN current mirror voltage). The voltage at the base of transistor Q300 is approximately 1.55 V measured with respect to ground, thus the current through resistor R103 is approximately 81 uA. The base voltage at transistor Q306 therefore corresponds to the 81 uA current through any NPN transistor of the same geometry as Q306 with an emitter resistance of 750 ohms.

Transistor Q308 will also conduct 81 uA. Accordingly, the collector of transistor Q308 "mirrors" the current flowing through transistor Q306. The collector current of transistor Q308 biases PNP transistors Q305 and Q302 so that the base voltage of transistor Q302 (PIMVA: PNP current mirror voltage A) will define 81 uA through any PNP transistor of the same geometry as Q302 with a 375 ohm resistor in its emitter circuit.

Transistor Q307 has a 1.875 kohm resistance tied to its emitter while its base is biased by NIMV, therefore its collector current will be approximately half of that of Q306 or 40 uA. The collector current of transistor Q307 will bias PNP transistors Q301 and Q304 so that the base voltage of Q301 (PIMVB: PNP current mirror voltage B) will define 40uA through any PNP transistor of the same geometry as Q301 with a 750 ohmresistor in its emitter circuit.

With further reference to FIG. 13, both transistors Q301 and Q302 have their double collectors tied together. Any PNP transistor with double collectors biased by PIMVA or PIMVB will conduct half of the mirrored current through one of its collectors alone. Thus, PIMVA can control two PNP current sources 40 uA each while PIMVB can control two 20 uA PNP current sources 20 uA each. This feature is used in the registers 110 and 110' as described below.

Figure 14A:
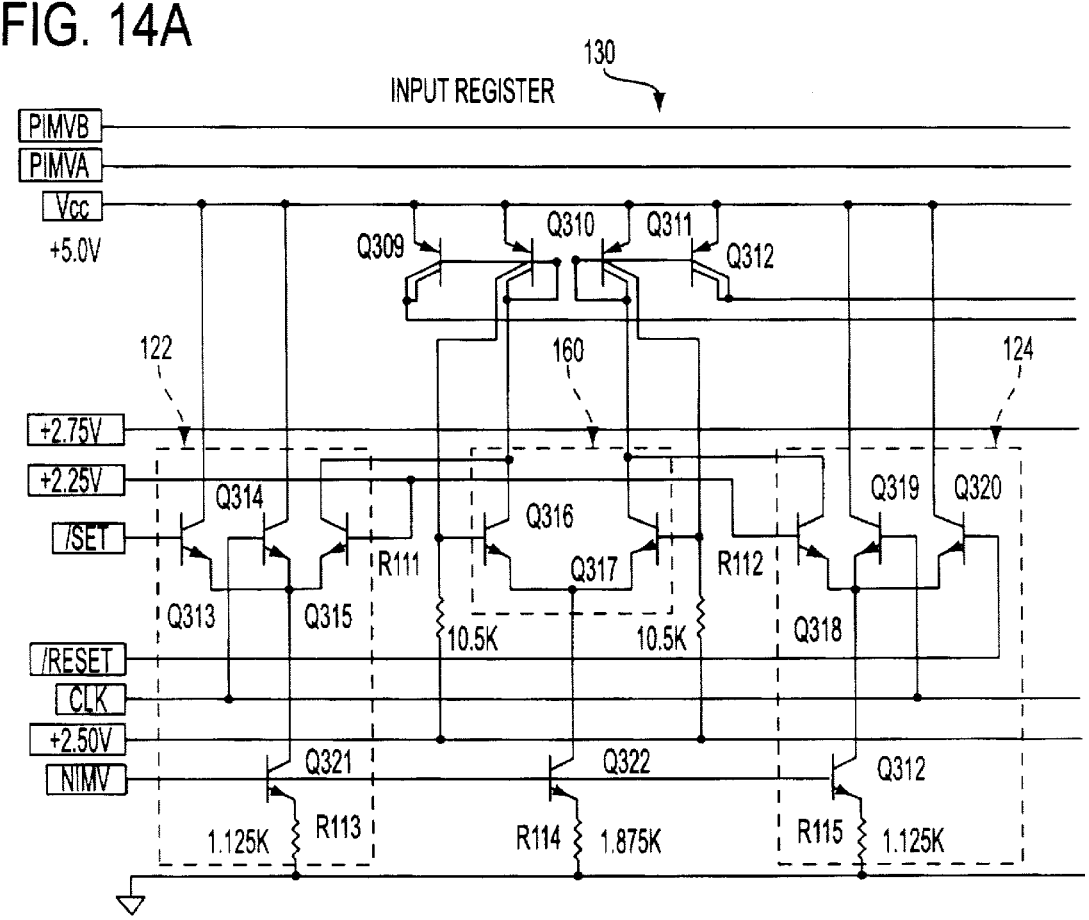
FIG. 14A is a detailed schematic diagram of input register of the J-K flip/flop shown in FIGS. 11A and 11B.

With reference to FIG. 14A, the input register 130 shown in FIG. 11B is shown in greater detail. The input register circuit 130 consists of transistors Q310–311, Q316–317 and Q322, and resistors R111–112 and R114. A 40 uA current is injected into the common emitter circuit 60 of transistors Q316–317 by current mirror Q322 and R114. The common emitter current will flow through either transistor Q316 or Q317. In the first case the collector current of Q316 is mirrored by Q310 back to its own base and returned to the +2.50 V reference line through resistor R111. The voltage drop caused by the mirrored current across R111 is +2.50 V+0.4 V while the voltage at the base of the other side is at +2.50 V. The positive feedback represented by the mirrored collector current back to its own base firmly locks the state of the register 110 such that transistor Q316 is conducting and Q317 is not. This state is said to be the SET state of the input register. In the RESET state, transistor Q317 is conducting and Q316 is not. The state of the input register can be changed by control of the input gates consisting of transistors Q313–15, Q321 and resistor R113, which form AND-gate 122, and transistors Q318–320, Q323 and resistor R115, which form AND-gate 124.

Initially, the effects of the /RESET input 114 on the input register 130 will be described when the input register 130 is in the SET state. Transistors Q318–320 and Q323 with resistor R115 form the negative-true AND-gate 124. This AND-gate 124 is enabled when the clock input CLK is in the logic 0 state (i.e. <+2.25 V). With such a CLK state, transistor Q319 will not conduct because its base is less positive than that of Q318. If /RESET is also in the logic 0 state, the base of transistor Q320 is also less positive than that of Q318. Thus the mirrored current of transistor Q323 will flow through Q318. The magnitude of the mirrored current of Q323 is set to approximately 60 uA. The collectors of transistors Q317 and Q318 are tied together, therefore the current of Q318 will be mirrored to the base of transistor Q317 through current mirror transistor Q311 causing a 600 mV voltage rise across resistor R112. In the SET state Q316 is conducting and its base is 400 mV more positive than the +2.50 V reference line. However, when transistor Q318 is activated, the base of transistor Q317 will be 600 mV more positive than the +2.50 V reference line and, therefore, it will also be 200 mV more positive than the base voltage of Q316. This voltage difference will cause Q316 to switch off and Q317 to switch on. When this has taken place, the combined currents of Q317 and 0318 will be 100 uA, causing the base voltage of Q317 to be 1000 mV more positive than the +2.50 V reference. Transistor Q317 is now conducting all the current of current mirror Q322 and R114. This state will be maintained even when the current of transistor Q318 is no longer aiding it keeping the input register 130 in the RESET state, which happens when the clock pulse becomes more positive than +2.25 V (i.e., at the leading edge of the positive clock pulse).

The circuits 122 and 124 are identical at both inputs 112 and 114 of the input register 130. Thus, the procedure of changing the input register state from RESET to SET while the clock input CLK is in the logic 0 state (<+2.25 V) is similar to the one described above except that this time the /RESET input has to be logic 1 (>+2.75 V) and the /SET input must be logic 0 (<+2.25 V).

Figure 14B:
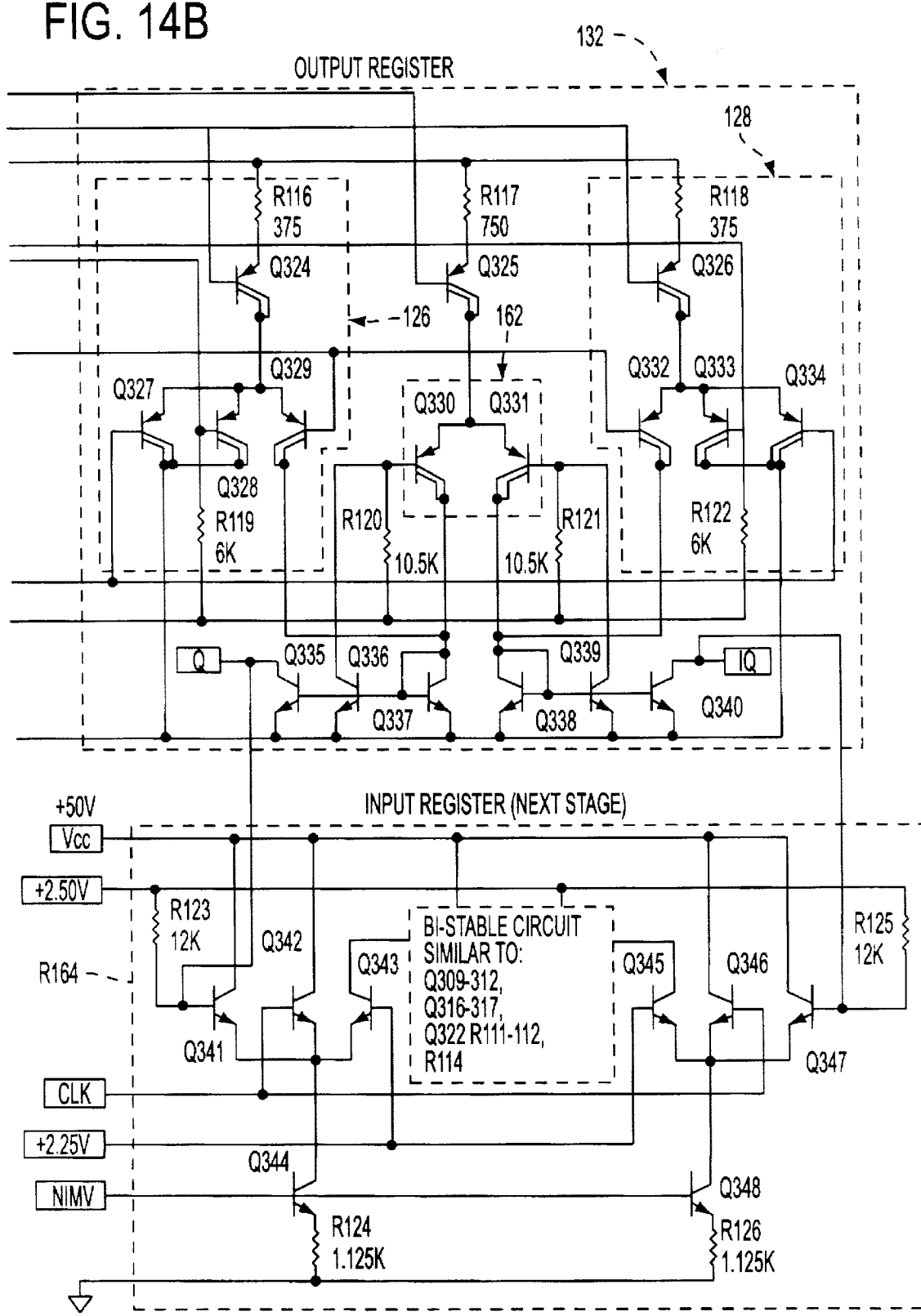
FIG. 14B is a detailed schematic diagram of the output register of the flip-flop of FIGS. 11A and 11B and the coupling circuit used to couple the output of one register stage to the input of second register stage.

With reference to FIG. 14B, the output register 132 is implemented by transistors Q324–340 and resistors R116–122. The flip-flop part of the register 132 is formed with transistors Q325, Q330–331, Q336–339 and resistors R117 and R120–121. Transistors 330 and 331 form a common emitter circuit 162. The 140 uA current sourced by Q325 either flows through Q330 or Q331 depending on whether the flip/flop is in the SET or RESET state. Supposing Q330 is conducting, its current is mirrored back to its base by current mirror Q337, Q336 causing a 400 mV drop at the base of Q330 with respect to the +2.50 V base bias voltage. Since the Q331 side of the output register is not conducting by assumption, the base of Q330 is 400 mV more negative than that of Q331 and this voltage difference is sufficient to lock the flip/flop in its SET state. Transistors Q324, Q327–329 and resistors R116, R119 form the input AND-gate 126 controlling the setting of the register 110, while the reset is controlled by AND-gate 128 formed by transistors Q326, Q332–334 and resistors R118 and R122.

If the output register is in the SET state, as long as the clock pulse is in the 0 logic state the AND-gates 126 and 128 associated with the output register 132 are inhibited. This is because transistors Q327 and Q334 are conducting, thus preventing transistors Q329 and Q332 from changing the state of the output register 132. If the input register 130 is in the RESET state the current of Q322 is flowing into Q311 via Q317, which will "mirror" it through Q312 into R122. Since both collectors of Q312 are connected together, the current flowing into R122 is twice that of Q322, i.e. 80 uA, making the base of transistor Q323 480 mV more positive than the +2.5 V bias source and 230 mV more positive than the +2.75 V gate reference. Current transistors Q316, Q310 and Q309 are inactive by assumption, thus the base of Q328 is at +2.5 V.

When the clock pulse becomes more positive than +2.75 V, both transistors Q333 and Q334 will cease to conduct and the current of source Q326 (80 uA) will flow through Q332 into the common collectors of transistors Q331 and Q338. Even if the output register is in the SET state at this moment, the 80 uA reset current will offset the effects of the 40 uA "set" current established through the positive feedback loop (i.e. Q330, Q337, Q336 and R120). The AND-gate 126 on the SET side, however, will remain inactive because the base of transistor Q328 is more negative than that of Q329. Transistor Q328 will dump the current of source Q324 to ground.

The 80 uA current flowing from Q332 into the common collectors of transistors Q331 and Q338 will activate the current mirrors consisting of transistors Q338, Q339 and Q340. The collector of Q339 is connected to the base of Q331, thus the positive feedback loop is complete. Even after the clock pulse level drops below +2.75 V and Q332 is switched off, Q331 will conduct all the current from source Q325 (40 uA), thus latching the output register in the RESET state. Thus, the RESET state of the input register 130 has been transferred to the output register while the clock pulse amplitude was more positive than +2.75 V. The conditions are generally symmetric, that is, if the input register 130 is in the SET state the output register 132 is in the SET state when the clock pulse amplitude exceeds the +2.75 V level.

The outputs of the output register 132 are the Q335 and Q340 transistor current mirrors. Each transistor can sink 40 uA and the logic outputs of Q and /Q are negative true. Thus, when the output register 132 is SET, current mirror Q335 is active and capable of sinking 40 uA. In the RESET state Q340 is the activated current mirror transistor.

The coupling of subsequent stages similar to the input and output registers 130 and 132, respectively, is also illustrated in FIG. 14B in the form of coupling circuit 164. It is assumed that the input register of the next stage is controlled by dual input AND-gates shown as transistors Q341–344 and Q345–348 with resistors R123–124 and R125–126. The bases of transistors Q341 and Q347 are returned to the +2.5 V bias line through 12 kohm resistors R123 and R125. The collectors of Q335 (Q output) and Q340 (/Q output) are respectively connected to the bases of transistors Q341 and Q347. When either Q335 or Q340 is sinking 40 uA it will cause a 480 mV voltage drop with respect to +2.5 V either at the base of Q341 or Q347, which corresponds to a 230 mV drop from the +2.25 V reference voltage line. The operation of the gates and the associated input register during the time when the clock pulse is less positive than +2.25 V is identical to that of the input register 130 consisting of transistors Q309–Q323 and resistors R111–115.

It will be appreciated, then, that the register 110 incorporates positive feedback paths used in both the input register 130 and the output register 132. The current through a balanced emitter coupled circuit is predetermined by means of a current source and the current of the conducting side is "mirrored", or in effect reflected, back to the base of the same side by a current mirror of the opposite sense (i.e., it being understood that NPN common emitter transistors use PNP current mirrors in the feedback loop and vice versa).

Also advantageously, the setting and resetting of the registers 130 and 132 is controlled by AND-gates 122, 124, 126 and 128. Since the output of each AND-gate is a current source, each AND-gate 122–128 can inject sufficient current into the selected side of the register (i.e., to a selected one of Q316 or Q317 and a selected one of Q330 or Q331) to overcome the effect of the positive feedback acting on the opposite side (i.e., on the presently conducting transistor Q316 or Q317, and Q330 or Q331) and transfer the current of the emitter coupled register to the selected side. Once this is accomplished, the selected side will latch the new state by means of the positive feedback described herein.

Most importantly, the management of the input and output registers 130 and 132 is accomplished in a manner in which neither register is active when the clock pulse signal is within a pre-determined, welldefined range. The input register 130 is enabled and the output register 132 is disabled with the low level clock pulse (inactive clock state). An intermediate range of clock pulse levels are provided at which both registers 130 and 132 are inhibited, but at which time the last state of the inputs at the input register 130 is latched into the input register as the clock pulse level crosses the threshold from enabling the input to disabling the input. This register management helps to ensure that noise on the clock pulse line will not erroneously trigger one or the other of the registers 130 or 132. The state of the input register 130 which is equal to the last state of the inputs as the clock signal crosses the level from enabling to disabling the inputs is transferred to the output register 132 as the clock pulse level crosses the threshold from disabling the output register AND-gates 126 and 128 to enabling them. This control sequence ensures against the possibility of any race condition caused by time delays.

Figure 15A:
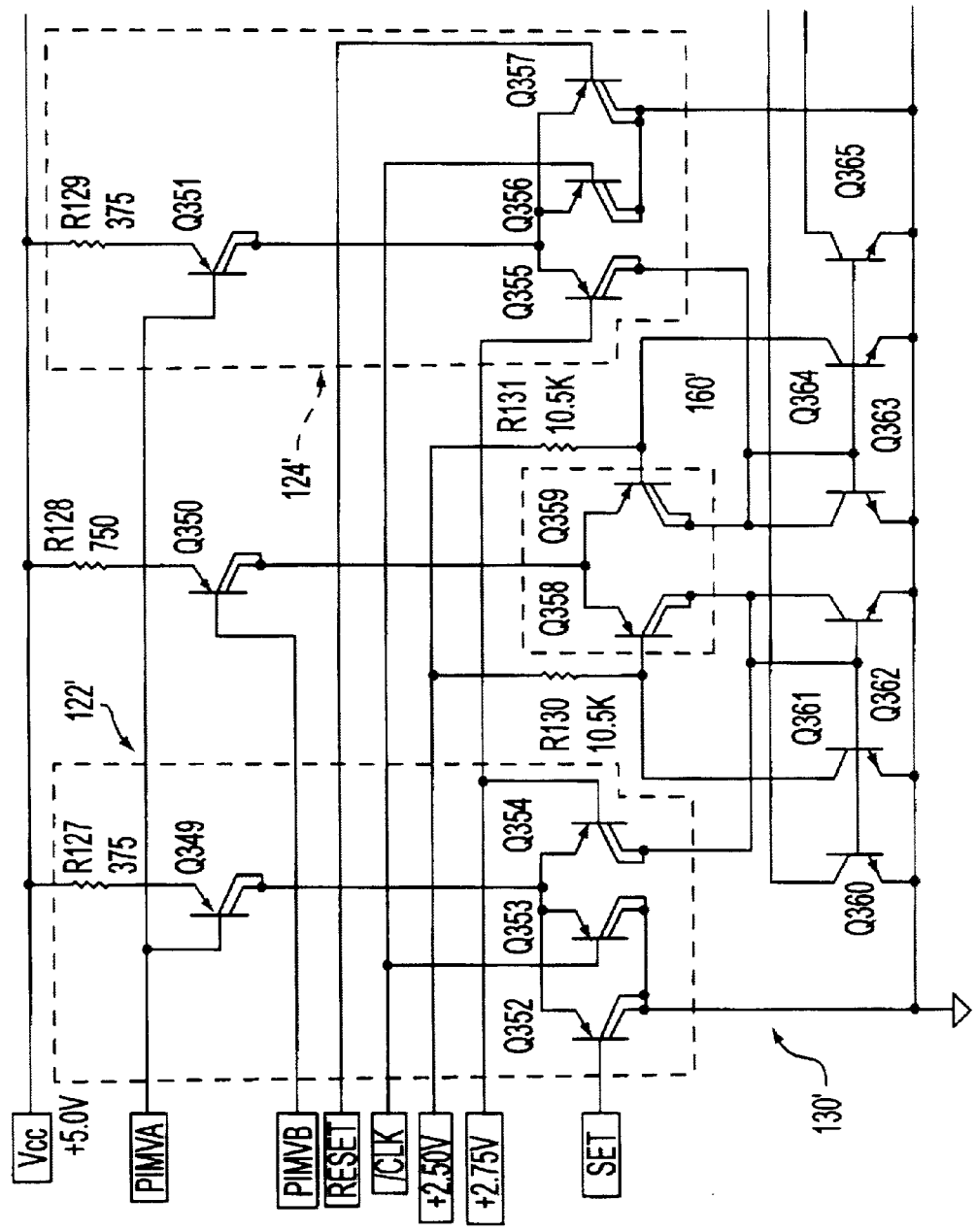
FIG. 15A is a detailed schematic diagram of the input register of the J-K flip/flop shown in FIGS. 12A and 12B.
Figure 15B:
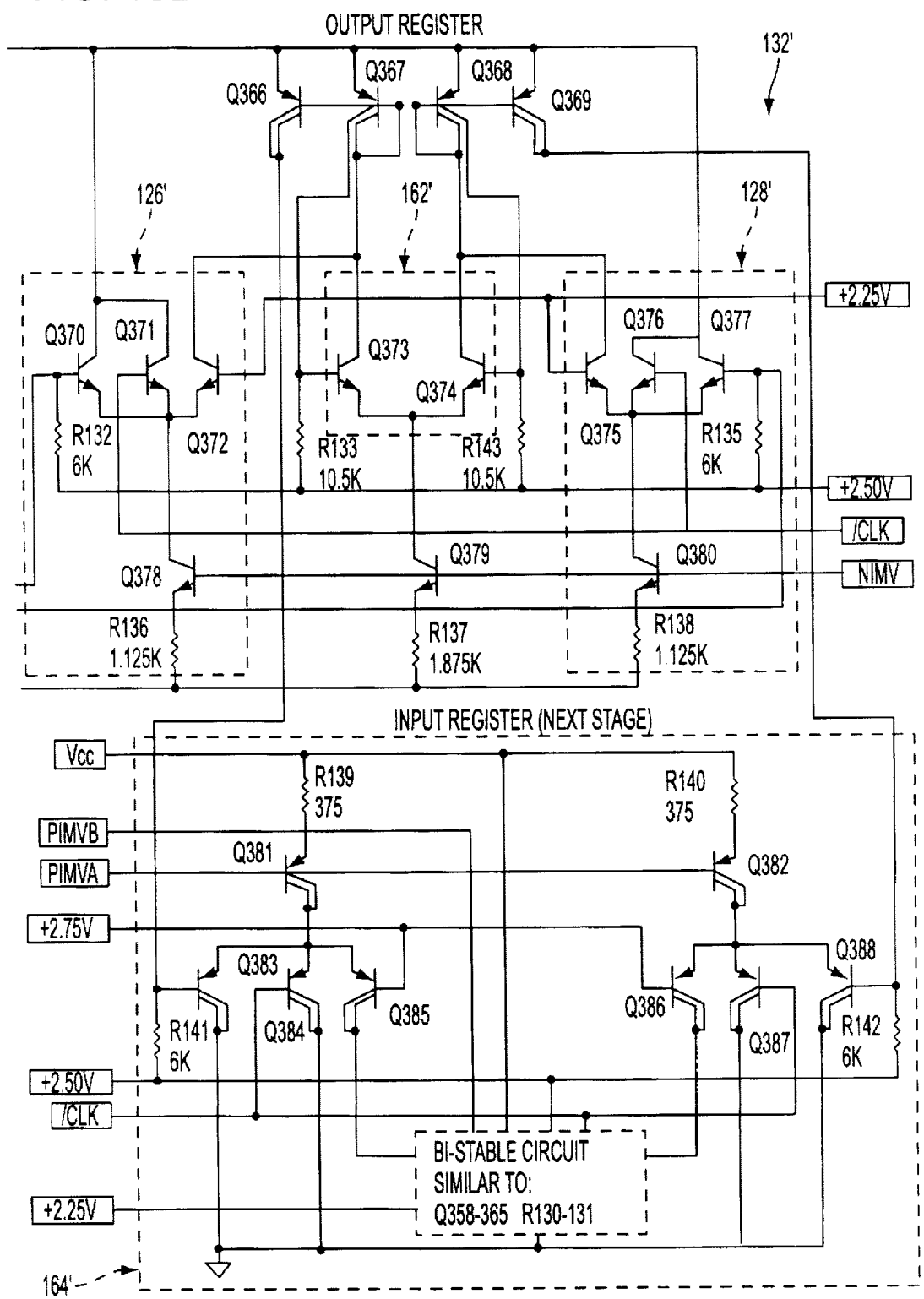
FIG. 15B is a detailed schematic diagram of the output register of the flip-flop shown in FIGS. 12A and 12B and a coupling circuit used to couple the output of one register stage to the input of a second register stage.

FIGS. 12A and 12B show the J-K flip/flop register 110' with positive true logic inputs 112' and 114' and a negative true clock pulse. The circuit implementation is illustrated in FIGS. 15A and 15B. Comparing FIGS. 14A, 14B and 15A,15B and considering the description of operation of FIGS. 14A, 14B, the operation of the register 110' will be apparent to one of ordinary skill in the art. The input register 130' (FIG. 5A) is formed by transistors Q349–Q365 and resistors R127–R131. The output register 132' (FIG. 15B) is formed by transistors Q366–Q380 and resistors R132–R138. In this case the input gates 122' and 124' and the input register 130' are configured with PNP transistors using NPN transistor collector loads and current mirrors. These circuits are virtually identical to those forming the output register 132 described herein.

In FIG. 15B, the output gates 126' and 128' and register 132' consist of NPN transistors with PNP transistors as collector loads and current mirrors. These circuits are virtually identical to those of the input gates 122, 124 and register 130 described therein.

In FIG. 15A, the common emitter circuit 160' of the input register 130' is formed by transistors Q358 and Q359. The common emitter circuit 162' in FIG. 15B is formed by transistors Q373 and Q374. In FIG. 15A the AND-gate 122' is formed by transistors Q352–Q354, Q349 and resistor R127. The AND-gate 124' is formed by transistors Q355–Q357, Q351 and resistor R129. In FIG. 15B, the AND-gate 126' is formed by transistors Q370–Q372, Q378 and resistors R132 and R136. The AND-gate 128' is formed by transistors Q375–Q377, Q380 and resistors R135 and R138. Coupling circuit 164' couples one register stage with a subsequent register stage.

The features of the register 110' shown in FIGS. 15A and 15B are similar to the register 110 of FIGS. 11B and 14A, 14B. The inactive level of the clock input is logic 1 (high) which enables the input gates 122', 124' and register 130' (FIG. 15A) and inhibits the output gates 126', 128' and register 132' (FIG. 15B). The logic 0 of the clock input inhibits the input gates 122', 124' and freezes the last state of the inputs in the input register 130'. While the clock changes from logic 1 to logic 0 there is a range of clock pulse voltage levels at which both input and output register gates 122'–128' are inhibited. When the clock pulse voltage level is low enough, the output gates 126', 128' will be enabled and the state of the input register 130' will be latched into the output register 132'.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. A supervisory circuit for an anti-lock brake system (ABS) unit including an electronic control unit (ECU) and an external power source, comprising:
   a power source monitor that inhibits the ABS unit when an external power source voltage deviates from a first predetermined window;
   an electronic control unit (ECU) monitor that monitors a periodic signal generated by the ECU and that inhibits the ABS unit if said periodic signal deviates from a second predetermined window; and
   a system supply voltage monitor that inhibits the ABS unit when an ECU supply voltage deviates from a third predetermined window.

2. The circuit of claim 1, further comprising an independent internal voltage reference source having a shunt regulator that provides power to said power source monitor, said ECU monitor and said system supply voltage monitor when said external power source is within a predetermined system battery voltage range.

3. The circuit of claim 2, further comprising a plurality of voltage reference lines that supply power from said independent internal voltage reference source to internal circuit components.

4. The circuit of claim 2, further comprising a plurality of clamping signal lines coupled to said independent internal voltage reference source, said external power source monitor, said system supply voltage monitor and said ECU monitor that inhibits energization of ABS unit solenoids upon sensed circuit inhibit conditions by said voltage reference source or one of said monitors.

5. The circuit of claim 2, wherein said independent internal voltage reference source comprises a band-gap voltage reference source.

6. The circuit of claim 1, wherein said external power source monitor comprises a first comparator.

7. The circuit of claim 6, wherein said first comparator is referenced to a voltage of approximately 1.5 V.

8. The circuit of claim 6, wherein said first comparator further protects said ECU from load dump pulses in response to said external power source voltage deviating from said first predetermined window.

9. The circuit of claim 6, wherein said first comparator is activated to inhibit the ABS unit when said external power source generates a voltage which exceeds a predetermined value.

10. The circuit of claim 1, wherein said system supply voltage monitor comprises a window comparator that compares an ABS unit voltage level to a predetermined voltage window and inhibits the ABS unit if the ABS unit voltage level deviates from a predetermined voltage range.

11. The circuit of claim 1, wherein said ECU monitor comprises:
   an exclusive OR-gate (EXOR) that generates a watch-dog signal in response to a duty cycle signal generated by the ECU; and
   a window comparator that monitors the timing of the watch-dog signal and inhibits the ABS unit if the watch-dog signal deviates from said second predetermined window.

12. The circuit of claim 11, further comprising:
   a second comparator coupled to said window comparator that detects watch-dog signal peaks;
   a flip-flop coupled to an output of said second comparator and to an output of said EXOR gate;
   a current mirror that is selectively switched between a plurality of charging capacitors and ground;
   said flip-flop being set by positive leading edges of said watch-dog signal peaks, thereby transmitting current flow from said current mirror into said plurality of charging capacitors.

13. The circuit of claim 12, wherein the positive leading edges terminate current flowing from said current mirror into said plurality of charging capacitors and switch the coupling of said current mirror from said plurality of charging capacitors to ground.

14. The circuit of claim 1, wherein said ECU monitor further comprises a window comparator and a master-slave flip-flop set, operatively coupled to said window comparator, said window comparator generating a signal that initializes an inhibit state of the ABS unit, said inhibit state being stored in said master-slave flip-flop set until two subsequent non-inhibit pulses are generated by said ECU monitor.

15. An anti-lock brake system (ABS) control system, comprising:

an electronic control unit (ECU) including an ECU power source that controls system operation and that generates a periodic watch-dog signal;

a system battery that provides power to said ECU power source;

a supervisory circuit comprising:

a supervisory circuit internal voltage reference source that provides power to said circuit independent of said system battery;

a first voltage detector that inhibits system operation when said system battery deviates from first predetermined operating levels;

a second voltage detector that inhibits system operation when said ECU power source deviates from second predetermined operating levels; and a watch-dog timer that monitors said periodic watch-dog signal and that inhibits system operation when said signal deviates from predetermined threshold operating parameters.

16. The ABS control system of claim 15, further comprising a plurality of clamp outputs coupled to said first and second voltage detectors and said watch-dog timer to inhibit system modulators in response to an inhibit signal from said supervisory circuit.

17. The ABS control system of claim 16, further comprising a reset device for controlling orderly power up and power down of said ECU when said ECU power source is less than a preset value, said reset device also causing said clamp outputs to inhibit the system modulators when said reset device is in a reset state.

18. The ABS control system of claim 15, wherein outputs from said first and second voltage detectors, said reset device and said watch-dog timer are input into a current sinking transistor whose output inhibits operation of said system.

19. The ABS control system of claim 15, wherein said watch-dog timer generates a saw-tooth waveform in response to the watch-dog signal such that positive peaks of the saw-tooth waveform coincide with positive leading edges of the watch-dog signal;

said watch-dog timer being operative to compare the positive peaks with preset voltage limits;

said watch-dog timer inhibiting system operation if the positive peaks fall outside of said predetermined threshold operating parameters.

20. The ABS control system of claim 19, wherein said watch-dog timer includes a masterslave flip-flop set that latches with a detected waveform positive peak falling outside said predetermined threshold operating parameters, and that unlatches subsequent to two consecutive waveform positive peaks falling within said predetermined threshold operating parameters.

21. The ABS control system of claim 20, further comprising a watch-dog pulse input including an exclusive OR-gate coupled to said master-slave flip-flop set that receives the watch-dog signal and that controls generation of the saw-tooth waveform.

22. An anti-lock brake system (ABS) supervisory circuit, comprising:

a power supply;

voltage monitoring means powered by said power supply that monitors at least one system voltage level and that inhibits system operation when the system voltage level deviates from a preset voltage window; and a watch-dog timer circuit powered by said power supply that monitors a system timing signal and that inhibits system operation if the timing signal deviates from a preset timing signal level.

23. The ABS supervisory circuit of claim 22, wherein said power supply comprises an independent internal voltage reference source that provides power to circuit components independently from said external power supply.

24. The ABS supervisory circuit of claim 22, wherein said voltage monitoring means comprises:

an electronic control unit (ECU) voltage monitor that inhibits system operation when an ECU supply voltage deviates from a preset ECU voltage window; and a system battery voltage monitor that inhibits system operation when a system battery voltage level deviates from a preset system battery voltage window.

25. An anti-lock brake system (ABS) supervisory circuit, comprising:

an internal voltage reference source, powered by an external system power supply having a system voltage, that generates an internal reference voltage that is independent from the voltage of said external system power supply; and voltage monitoring means powered by said independent internal voltage reference source that monitors the system voltage level and that inhibits the system operation when the system voltage level deviates from a preset voltage window.

26. The supervisory circuit of claim 25, wherein said voltage monitoring means comprises:

an electronic control unit (ECU) voltage monitor that inhibits system operation when an ECU supply voltage deviates from a preset ECU voltage window; and a system battery voltage monitor that inhibits system operation when a system battery voltage level deviates from a preset system battery voltage window.

27. The supervisory circuit of claim 25, further comprising a watch-dog timer circuit powered by said independent internal voltage reference source that monitors a system timing signal and that inhibits system operation if the timing signal deviates from a preset timing signal level.

28. The supervisory circuit of claim 25 wherein said voltage monitoring means includes a hysteresis functionality that prevents reactivation of system operation once the system voltage has been inhibited, until the system voltage both no longer deviates from the preset voltage window and is clear of the endpoint of the preset voltage window by a predetermined amount.

29. A supervisory circuit for an anti-lock brake system (ABS) unit, comprising:

an external power supply;

an independent internal voltage reference source that provides power to circuit components independently from said external power supply; and a watch-dog timer circuit powered by said independent internal voltage reference source that monitors a system timing signal and that inhibits system operation if the timing signal deviates from a preset timing signal level.

30. The supervisory circuit of claim 29, further comprising:

an electronic control unit (ECU) voltage monitor that inhibits system operation when an ECU supply voltage deviates from a preset ECU voltage window; and a system battery voltage monitor that inhibits system operation when a system battery voltage level deviates from a preset system battery voltage window.

* * * * *